(12) United States Patent
Nakane et al.

(10) Patent No.: US 7,089,809 B2
(45) Date of Patent: Aug. 15, 2006

(54) TORQUE SENSOR AND ELECTRIC POWER STEERING SYSTEM HAVING SAME

(75) Inventors: Naoki Nakane, Toyota (JP); Kiyoshi Sugimura, Toyoake (JP); Shigetoshi Fukaya, Toyota (JP); Masao Tokunaga, Gamagori (JP); Kenji Takeda, Okazaki (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 11/359,561

(22) Filed: Feb. 23, 2006

(65) Prior Publication Data
US 2006/0137474 A1    Jun. 29, 2006

Related U.S. Application Data

(60) Continuation of application No. 10/456,675, filed on Jun. 9, 2003, which is a division of application No. 10/147,917, filed on May 20, 2002, now Pat. No. 6,880,411.

(30) Foreign Application Priority Data

| May 18, 2001 | (JP) | ............................. 2001-148894 |
| Aug. 29, 2001 | (JP) | ............................. 2001-259961 |
| Oct. 15, 2001 | (JP) | ............................. 2001-316435 |
| Oct. 15, 2001 | (JP) | ............................. 2001-316788 |

(51) Int. Cl.
*G01L 3/02*  (2006.01)
*G01L 3/10*  (2006.01)
*G01L 3/12*  (2006.01)
*G01L 3/14*  (2006.01)

(52) U.S. Cl. ................................ 73/862.331
(58) Field of Classification Search ................... None
See application file for complete search history.

(56) References Cited

U.S. PATENT DOCUMENTS

| 4,509,611 A | 4/1985 | Kade et al. |
| 4,724,710 A | 2/1988 | Murty |
| 4,784,002 A | 11/1988 | Io |
| 4,984,474 A | 1/1991 | Matsushima et al. |
| 5,298,827 A | 3/1994 | Sugiyama |
| 7,336,989 | 12/1995 | Sakamoto |
| 5,796,014 A | 8/1998 | Chikaraishi et al. |
| 5,811,695 A | 9/1998 | Satoh et al. |

(Continued)

FOREIGN PATENT DOCUMENTS

GB    559116    6/1942

(Continued)

*Primary Examiner*—Edward Lefkowitz
*Assistant Examiner*—Octavia Davis
(74) *Attorney, Agent, or Firm*—Posz Law Group, PLC

(57) ABSTRACT

A torque sensor has a torsion bar coaxially in alignment with input and output shafts, a ring shaped magnet fixed to an axial end of the input shaft, a pair of magnetic yokes fixed to an axial end of the output shaft, and a magnetic sensor for detecting magnetic flux density generated between the pair of magnetic yokes. Each of the magnetic yokes is provided with claws, which are circumferentially spaced at constant intervals, and whose number is equal to that of each of N and S poles alternately arranged circumferentially in the magnet. Each, center of the claws coincides with a boundary between immediately adjacent N and S poles of the magnet, when the torsion bar is not twisted. The magnetic sensor is inserted into an axial gap between the pair of magnetic yokes without contacting the magnetic yokes.

11 Claims, 17 Drawing Sheets

U.S. PATENT DOCUMENTS

| | | |
|---|---|---|
| 6,026,925 A | 2/2000 | Nagao et al. |
| 6,163,148 A | 12/2000 | Takada et al. |
| 6,223,608 B1 | 5/2001 | Yasui |
| 6,295,879 B1 | 10/2001 | Miller et al. |
| 6,327,927 B1 | 12/2001 | Rogg et al. |
| 6,341,535 B1 | 1/2002 | Yasui |
| 6,539,816 B1 | 4/2003 | Kogiso et al. |
| 6,880,411 B1 * | 4/2005 | Nakane et al. ......... 73/862.331 |

FOREIGN PATENT DOCUMENTS

| | | |
|---|---|---|
| JP | A-6-281513 | 10/1994 |
| JP | A-7-336989 | 12/1995 |
| JP | A-8-159887 | 6/1996 |
| JP | A-11-304607 | 11/1999 |
| WO | WO 02/071019 | 9/2002 |

* cited by examiner

TORQUE SENSOR AND ELECTRIC POWER STEERING SYSTEM HAVING SAME

CROSS REFERENCE TO RELATED APPLICATION

This application is a continuation of U.S. application Ser. No. 10/456,675, filed on Jun. 9, 2003 which is a divisional of U.S. application Ser. No. 10/147,917, filed on May 20, 2002, now U.S. Pat. No. 6,880,411, issued on Apr. 19, 2005, entitled TORQUE SENSOR AND ELECTRIC POWER STEERING SYSTEM HAVING SAME, which is based upon and claims the benefit of priority of Japanese Patent Applications No. 2001-148894 filed on May 18, 2001, No. 2001-259961 filed on Aug. 29, 2001, No. 2001-316435 filed on Oct. 15, 2001 and No. 2001-316788 filed on Oct. 15, 2001, the contents of which are incorporated herein by reference.

BACKGROUND OF THE INVENTION

1. Field of the Invention

The present invention relates to a torque sensor for detecting torque applied to a torsion bar to be used in a rotating force transmission system, in particular, in an electric power steering system.

2. Description of Related Art

Conventionally, according to a device disclosed in JP-A-8-159887 for detecting torsion torque applied to a torsion bar, a magnet and a magnetic sensor are used. The magnet is fixed to an axial end of the torsion bar and the magnetic sensor is fixed to the other axial end of the torsion bar. When the torsion torque is applied to the opposite axial ends of the torsion bar, the torsion bar is twisted so that a rotation displacement of the magnetic sensor relative to the magnet is changed. Accordingly, an output responsive to the applied torque is generated from the magnetic sensor.

According to the detecting device mentioned above, electric contacts such as a brush and a slip ring for supplying electric power to and picking up a signal from the magnetic sensor are necessary, since the magnet and the magnetic sensor are fixed to the opposite axial ends of the torsion bar that is rotated. The use of the brush and the slip ring is prone to deteriorate reliability of the detecting device.

Further, according to another detecting device disclosed in JP-A-6-281513, though it is similar to JP-A-8-159887 in view that the magnet and the magnetic sensor are used, helical gears, to which the magnet is fixed, are used for converting the rotation displacement of the axial end of the torsion bar relative to the other axial end of the torsion bar into an axial displacement of the magnet relative to the magnetic sensor, that is fixed to a housing. Accordingly, the electric contacts for supplying electric power to and picking up a signal from the magnetic sensor are not necessary.

However, this detecting device uses the gears so that construction of the detecting device is complicated. Further, the device has a drawback in performance since detection errors and response delays seem to be unavoidable due to backrush of the gears and possible wear of the gears.

SUMMARY OF THE INVENTION

An object of the present invention is to provide a torque sensor without using electric contacts, whose construction is more compact and whose performance is more accurate.

Another object of the present invention is to provide an electric power steering system incorporating the torque sensor.

It is an aspect of the present invention to provide a method of easily assembling a ferromagnetic member to soft magnetic members in the torque sensor.

To achieve any of the above objects, in a torque sensor for detecting torsion torque to be applied to a first shaft and a second shaft, a resilient member is disposed between and fixed to the first and second shafts so that the first shaft, the resilient member and the second shaft are coaxially in alignment with one another. The resilient member being resiliently twisted, when torsion torque is applied to the first shaft and the second shaft. A ferromagnetic member is connected to one of a given position of the first shaft and a given position of the resilient member on a side of the first shaft and rotatable together therewith. The ferromagnetic member produces a magnetic field. A soft magnetic member is connected to one of a given position of the second shaft and another given position of the resilient member on a side of the second shaft and rotatable together therewith. The soft magnetic member is positioned within the magnetic field and forms a magnetic circuit so that magnetic flux density generated in the magnetic circuit is varied when rotation displacement of the soft magnetic member relative to the ferromagnetic member is changed according to the twist of the resilient member. A magnetic sensor is positioned in a vicinity of and without contacting the soft magnetic member for detecting the magnetic flux density generated in the magnetic circuit.

With the torque sensor mentioned above, the magnetic sensor does not detect directly the magnetic flux generated from the ferromagnetic member. Accordingly, the magnetic sensor can be fixed, for example, to a housing where the torque sensor is accommodated without the electric contacts so that reliability of the torque sensor is higher.

It is preferable to have an auxiliary soft magnetic member having a magnetic flux collective portion in the torque sensor. The auxiliary soft magnetic member is positioned in a vicinity of the soft magnetic member for introducing magnetic flux from the soft magnetic member and concentrating the same to the magnetic flux collective portion. Accordingly, the magnetic sensor detects the magnetic flux density generated in the magnetic circuit through the magnetic flux collective portion. As the magnetic flux generated in the auxiliary soft material member is concentrated to the magnetic flux collective portion, the magnetic sensor can detect average of the magnetic flux density generated over an entire circumference of the soft magnetic member. Accordingly, detecting errors are hardly caused by manufacturing errors, assembly inaccuracy of the components constituting the magnetic circuit or misalignment between the first and second shafts.

Preferably, the ferromagnetic member is a ring shaped magnet having N and S poles alternately arranged circumferentially and the soft magnetic member is a pair of ring shaped magnetic yokes that are positioned around an outer circumference of the magnet and axially opposed to each other with an axial gap therebetween. Each of the magnetic yokes has claws which are radially spaced at constant intervals and whose number is equal to that of each of the N and S poles. Further, the claws of one of the magnetic yokes axially extend toward and are positioned to alternate circumferentially with those of the other of the magnetic yoke. The magnetic sensor is positioned in the axial gap between the pair of the magnetic yokes.

With the construction mentioned above, when the angular position of the magnet relative to the magnetic yokes when the resilient member is twisted, the claws of one of the magnetic yokes come closer to the N or S poles and the claws of the other of the magnetic yokes come closer to the S or N poles. Polarity of magnetic flux flowing in the one of the magnetic yokes is opposite to that in the other of the magnetic yokes. Passive or negative magnetic flux density, which is substantially proportional to a twist amount of the resilient member, is generated between both the magnetic yokes.

Further, it is preferable that the auxiliary soft magnetic member is a pair of ring shaped auxiliary magnetic yokes each having the magnetic flux collective portion. One of the auxiliary magnetic yoke is positioned around an outer circumference of the one of the magnetic yoke and the other of the auxiliary magnetic yoke is positioned around an outer circumference of the other of the magnetic yoke so that the magnetic flux collective portions of the pair of the auxiliary magnetic yokes are axially opposed to each other with an axial gap therebetween. In this case, the magnetic sensor is positioned in the axial gap between the magnetic flux collective portions.

Furthermore, it is preferable that a length of the axial gap between both the magnetic flux collective portions is shorter than that between both portions of the pair of auxiliary magnetic yokes other than the magnetic flux collective portions. This construction serves to improve detection accuracy of the torque sensor.

As an alternative, the torque sensor may have a first rotation transmitting member through which the magnet is connected to the one of the given posit ion of the first shaft and the given position of the resilient member on a side of the first shaft and a second rotation transmitting member through which the soft magnetic member is connected to the other of the given position of the second shaft and the given position of the resilient member on a side of the second shaft. In this case, the magnet and the pair of magnetic yokes are positioned axially in parallel with the resilient member.

Preferably, the first rotation transmitting member is a first gear fixed to the first shaft and a second gear fixed to the magnet, the first and second gears being in mesh with each other, and the second rotation transmitting member is a third gear fixed to the second shaft and a fourth gear fixed to the magnetic yokes, the third and fourth gears are being in mesh with each other.

With this construction, a sensing portion such as the ferromagnetic member, soft magnetic member and the magnetic sensor can be assembled separately from the first and second shafts and the resilient member. Accordingly, it is simpler to assemble the sensing portion, for example, to the electric power steering system. Further, the sensing portion can be replaced as a single body, which facilitates maintenance operation.

Further preferably, each axial center of the claws of both the magnetic yokes is positioned to substantially coincide with a boundary between immediately adjacent N and S poles of the magnet, when a twist angle of the resilient member shows a reference value. When the resilient member is not twisted, that is, when the torsion torque is not applied to the first and second shafts, if the axial center of the claws is set to substantially coincide with a boundary between immediately adjacent N and S poles of the magnet the torque sensor is less influenced by magnetization whose value is lowered due to temperature change.

If two magnet sensors whose magnet is detecting directions are opposite to each other are used and, preferably are positioned symmetrically with respect to an axis of the soft magnetic member, difference of the outputs between the two sensors can be used to cancel temperature drift of the magnet, the magnetic yokes and the magnetic sensor and the sensibility of the torque sensor is doubled.

As an alternative, the magnet sensor may be more than two sensors which are positioned circumferentially at constant intervals and whose magnetism detecting directions are same to one another. If the outputs from the sensors are processed through adding or average calculation, the detecting accuracy of the torque sensor is remarkably improved without since dimensional fluctuation of magnetic circuit components such as the magnet and the magnetic yokes and position fluctuation of the magnetic sensors are less influenced.

It is preferable that a magnetic seal covers at least outer circumference of the magnetic sensor. The magnetic seal serves to eliminate influences of terrestrial magnetism and magnetic fields generated around the torque sensor so that the erroneous detection is avoided. The magnetic seal may cover only an outer circumference of the magnetic sensor or an entire portion of the magnetic circuit of the torque sensor.

Preferably, axial length of the magnet is longer than that of the magnetic yoke. Iron filings can be stuck to edges of the magnet without entering into a radial gap between the magnet and the magnetic yokes, which does not adversely affect on the magnetic circuit for detecting the torque so that the erroneous detection may be avoided.

In case that the torque sensor mentioned above is incorporated into an electric power steering system for steering a vehicle wheel, one of the first and second shafts is connected to one end of the steering to which steering torque is applied, the other of the first and second shafts is connected to a steering power transmission mechanism and an electric motor gives a drive force to the steering power transmission mechanism in response to a control current from a control circuit in response to a detected output of the magnetic sensor for assisting the steering torque applied to the steering.

If the magnetic sensor is hole IC, the torque sensor is compact and inexpensive since auxiliary circuits such as again adjusting circuit, an offset adjusting circuit and a temperature compensation circuit are not necessary, so the torque sensor can be composed of less number of components. Further, since the hole IC does not require an oscillating circuit so that noises are hardly radiated, the hole IC does not give a noise problem to surrounding electric devices.

It is preferable that the control circuit has a plate board on which the magnetic sensor is simultaneously mounted. In this case, wire harnesses and connectors for connecting the torque sensor and the control circuit are not necessary, which results in cost saving and better reliability because of no electric contacts.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

First Embodiment

A torque sensor 1 according to a first embodiment is described with reference to FIGS. 1 to 4D.

Figure 1:
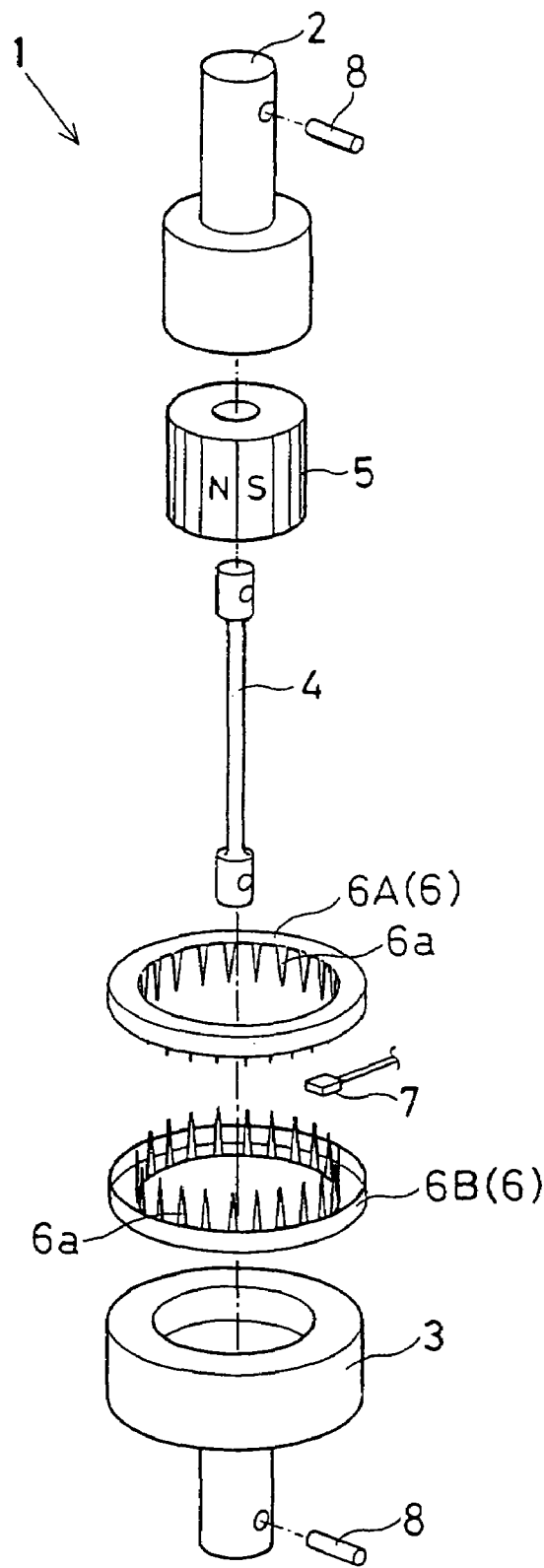
FIG. 1 is an exploded perspective view of a torque sensor according to a first embodiment of the present invention.
Figure 2A:
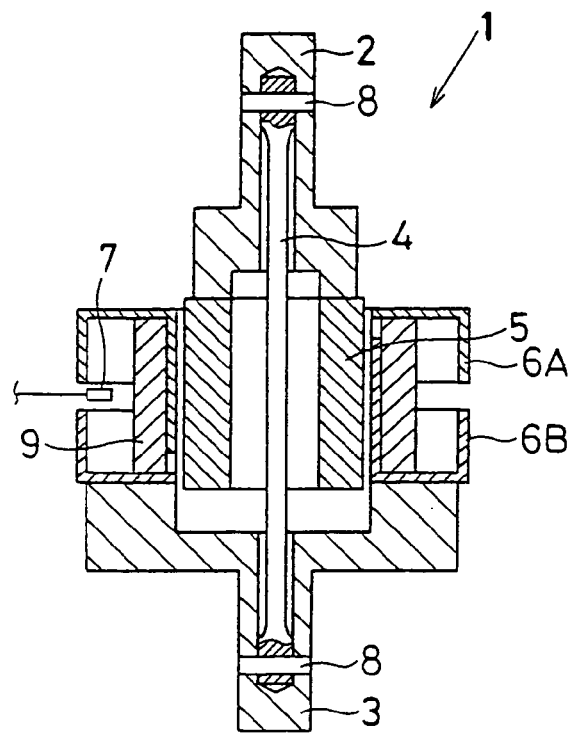
FIG. 2A is a cross sectional view of the torque sensor of FIG. 1.
Figure 2B:
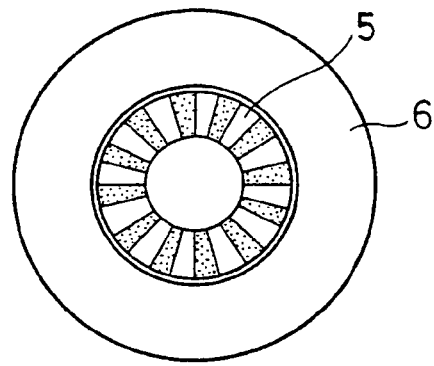
FIG. 2B is a plan view of a magnet and magnetic yokes of the torque sensor of FIG. 1.
Figure 2C:
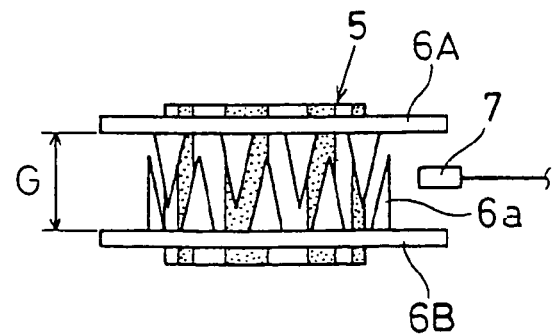
FIG. 2C is an elevation view of the magnet and the magnetic yokes of the torque sensor of FIG. 1.

FIG. 1 shows an exploded perspective view of the torque sensor 1. FIG. 2A is a cross sectional view of the torque sensor 1. FIGS. 2B and 2C show plan and elevation views of a magnet and magnetic yokes, respectively.

The torque sensor 1 is applicable, for example, to an electric power steering system for a vehicle (refer to FIG. 17) and disposed between an input shaft 2 and an output shaft 3 that constitute a steering shaft. The torque sensor 1 is for detecting steering torque applied to the steering shaft.

The torque sensor 1 is composed of a torsion bar 4 (resilient member) connecting coaxially the input shaft 2 and the output shaft 3, a magnet 5 (ferromagnetic member) fixed to an axial end of the input shaft 2 on a side of the output shaft 3, a pair of magnetic yokes 6 (soft magnetic member) fixed to an axial end of the output shaft 3 and a magnetic sensor 7 for detecting magnetic flux density generated between, the pair of the magnetic yokes 6.

Opposite axial ends of the torsion bar 4 are inserted into holes of the input and output shafts 2 and 3, respectively, and fixed via pins 8 to the other axial end of the input shaft 2 and the other axial end of the output shaft 3, respectively. The torsion bar 4 has given torsion/torque characteristics necessary for bringing an adequate rotating displacement of the axial end thereof relative to the other axial end thereof. Accordingly, when the torsion bar 4 is twisted, the axial end of the input shaft 2 can be rotated, or circumferentially shifted, relative to the axial end of the output shaft 3.

The magnet 5, which is formed in a ring shape and composed of N and S poles that are alternately arranged in a circumferential direction thereof, is positioned outside an outer circumference of the torsion bar 4. The magnet 5 has, for example, 24 poles.

As shown in FIG. 1, each of the pair of magnetic yokes 6 (6A, 6B) is formed in a ring shape and arranged around and in a vicinity of an outer circumference of the magnet 5. Each of the magnetic yokes 6A or 6B is provided with claws 6a which are spaced circumferentially at constant intervals and whose number is equal to that of N or S poles of the magnet 5 (12 pieces). The pair of the magnetic yokes 6 are fixed to and supported by a fixing base or holder 9 (refer to FIG. 2) in such a manner that the claws 6a of the magnetic yoke 6A and the claws 6a of the magnetic yoke 6B extend axially in a direction of coming close to each other and are positioned to circumferentially alternate with one another.

In a state that the torsion bar 4 is not twisted (when torsion torque is not applied to the torsion bar 4 to cause the input shaft 2 to rotate relative to the output shaft 3), each axial center of the claws 6a of the magnetic yokes 6 (6A and 6B) is positioned to coincide with a boundary between immediately adjacent N and S poles of the magnet 5.

As more clearly shown in FIG. 2C, the magnetic sensor 3 is positioned in an axial gap G existing between the magnetic yoke 6A and the magnetic yoke 6B and detects the magnetic flux density generated between the magnetic yokes 6A and 6B. The magnetic sensor 3 is fixed to a given position of a housing (not shown) without coming in contact with the magnetic yokes 6.

The magnetic sensor 7 has a hole element, a hole IC or a magnetic resistance element which outputs an electric signal (for example, voltage signal) whose value is converted from a value of the detected magnetic flux density.

Figure 3B:
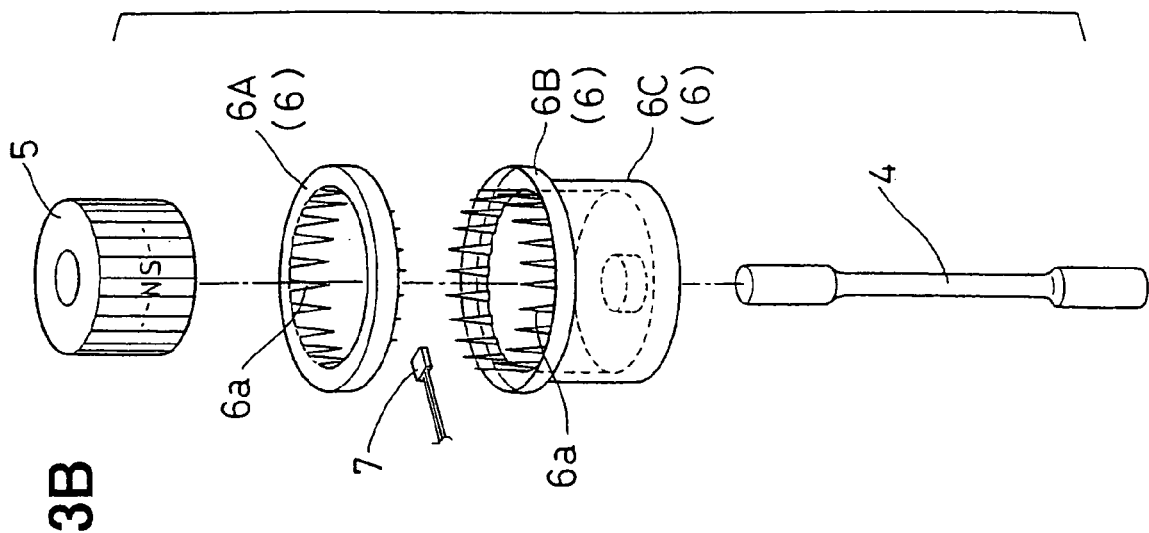
FIG. 3B is an exploded perspective view of the torque sensor of FIG. 3A.
Figure 3A:
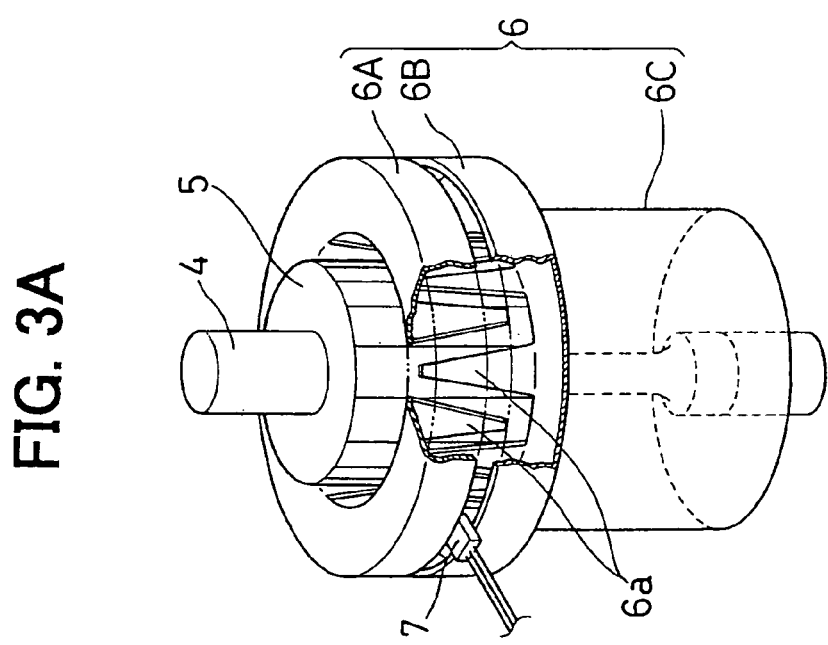
FIG. 3A is a perspective view of a torque sensor according to a modification of the first embodiment.

Though the magnet 5 is fixed to the axial end of the input shaft 2 and the magnetic yokes 6 are fixed to an axial end of the output shaft 3 in the above embodiment, as shown in FIGS. 1 to 2C, the magnet 5 may be fixed to the axial end of the torsion bar 4 on a side of the input shaft 2 and the magnetic yokes 6 may be fixed to the other axial end of the torsion bar 4 on a side of the output shaft 3, as shown in FIGS. 3A and 3B. In this case, an inner surface of the ring shaped magnet 5 is press fitted to an outer surface of the torsion bar 4 and an inner hole of a holder 9A for supporting the ring shaped magnetic yokes 6A and 6B is press fitted to the outer surface of the torsion bar 4.

The magnet 5 and the magnetic yokes 6 are assembled in the torque sensor 1 and the magnet 5 is positioned relative to the magnetic yokes 6 through the following steps;

(1) fixing the ring shaped magnetic yokes 6 to the torsion bar 4 on a side of the output shaft 3 or the axial end of the output shaft 3, for example, by press fitting or gluing, (2) inserting the magnet 5 into the ring shaped magnetic yokes 6 and holding the magnet 5 therein so as to allow a free rotation relative to the torsion bar 4 or the input shaft 2 for tentative assembly, (3) defining a magnet rest position where the magnet 5 rests within the ring shaped magnet yokes 6 due to magnetic attracting force generated between the magnet 5 and the ring shaped magnet yokes 6, and (4) fixing the magnet 5 to the torsion bar 4 on a side of the input shaft 2 or the axial end of the input shaft 2 in such a manner that the magnet 5 maintains the magnet rest position.

An operation of the torque sensor 1 is described hereinafter.

Figures 4A, 4B, 4C:
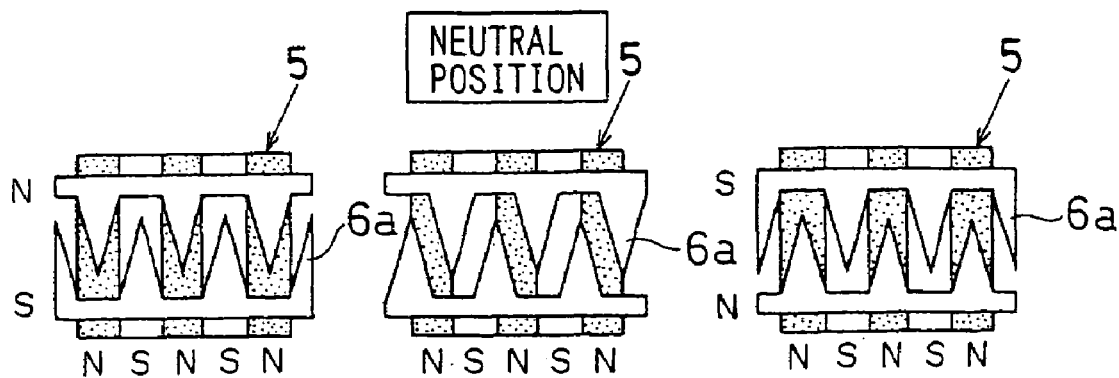
FIG. 4A is a schematic view of the magnet and the magnetic yokes when a torsion bar is twisted in a direction according to the first embodiment.
FIG. 4B is a schematic view of the magnet and the magnetic yokes when the torsion bar is not twisted according to the first embodiment.
FIG. 4C is a schematic view of the magnet and the magnetic yokes when the torsion bar is twisted in another direction according to the first embodiment.
Figure 4D:
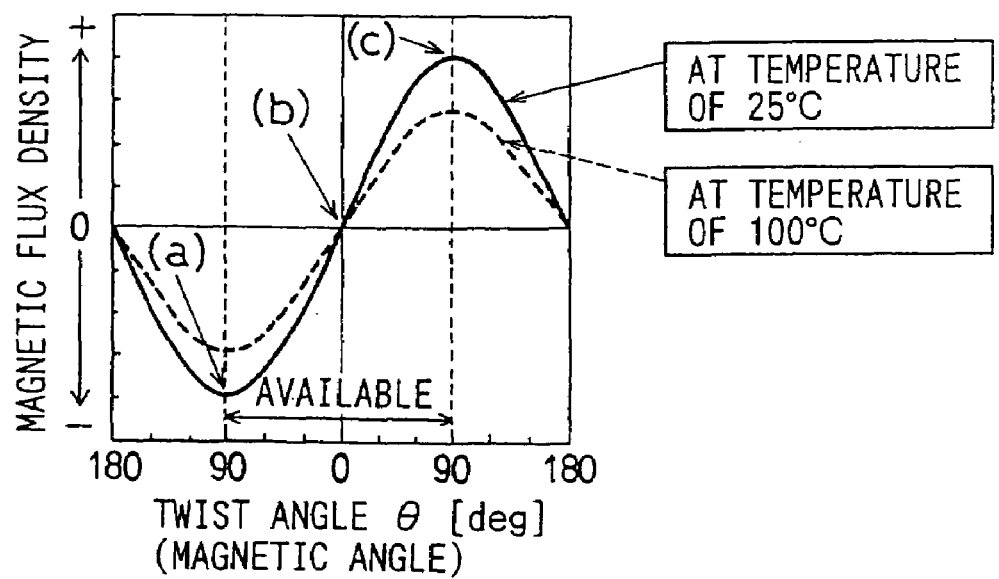
FIG. 4D is a chart showing a relationship between magnetic flux density and twist angle of the torsion bar according to the first embodiment.

As shown in FIG. 4B, in the state that torque is not applied to the torsion bar 4 so that the input shaft 2 is not rotated relative to the output shaft 3, that is, at a neutral position that the torsion bar 4 is not twisted, each axial center of the claws 6a of the magnetic yokes 6 coincides with a boundary between the immediately adjacent N and S poles of the magnet 5. In this case, since the number of lines of magnetic force passing between each of N poles and each of the claws 6a is equal to that passing between the each of the claws 6a and each of S poles, the lines of magnetic force are closed within the respective magnetic yokes 6A and 6B and do not leak into the axial gap G between the magnetic yoke 6A and the magnetic yoke 6B. Accordingly, the value of the magnetic flux density to be detected by the magnetic sensor 7 is zero, as shown in FIG. 4D.

As shown in FIG. 4A or 4C, in a state that torque is applied to the torsion bar 4 so that the input shaft 2 is rotated relative to the output shaft 3, that is, when the torsion bar 4 is twisted, an angular position of the magnet 5, which is fixed to the input shaft 2, relative to the pair of magnetic yokes 6, which are fixed to the output shaft 3, is circumferentially changed. As the each axial center of the claws 6a of the magnetic yokes 6 is circumferentially shifted from a boundary between the respective N and S poles of the magnet 5, the number of lines of magnetic force having N or S pole increases in each of the magnetic yokes 6A and 6B. Since polarity of the lines of magnetic force whose number increases in one of the magnetic yokes 6A is opposite to that in the other of the magnetic yokes 6B, the magnetic flux density is generated between the magnetic yokes 6A and 6B, that is, in the axial gap G. The value of the magnetic flux density is about proportional to a twisted amount of the torsion bar 4 and its polarity can be inverted according to the direction in which the torsion bar 4 is twisted.

Advantages of the torque sensor 1 according to the first embodiment are described hereinafter.

When the torsion bar 4 is twisted and the relative position of the magnet 5 to the pair of magnetic yokes 6 is circumferentially changed, the magnetic flux density between the pair of magnetic yokes 6 is changed at an entire circumference thereof and the value of the magnetic flux density is identical at any circumferential position. Accordingly, if the magnetic sensor 7 is position at a given position in the axial gap G with which the magnetic yokes 6A and 6B are opposed to each other, the magnetic sensor 7 can detect the magnetic flux density between the pair of magnetic yokes 6 without contacting the magnetic yoke 6. Therefore, detecting reliability of the torque sensor 1 is higher since the electric contacts (for example, the brush and the slip ring) for the magnetic sensor 7 are not necessary.

Further, since the each axial center of the claws 6a of the magnetic yokes 6 coincides with a boundary between the immediately adjacent N and S poles of the magnet 5, when the torsion bar 4 is not twisted, a neutral point of the magnetic sensor 7 can be never shifted, even if magnetic force of the magnet 5 is changed due to temperature change, as shown in FIG. 4D. Accordingly, the torque sensor 1 is unlikely to be affected by offset drift and accuracy thereof in a vicinity of the neutral point is more stable.

Furthermore, since, after the magnet rest position is defined, the magnet 5 is fixed to, the torsion bar 4 or the input shaft 2, so as to maintain the magnet rest position, the position of the magnet 5 relative to the magnetic yokes 6 can be accurately defined so that the output of the magnetic sensor is substantially zero, when the torsion bar 4 is not twisted.

Second Embodiment

A torque sensor 1 according to a second embodiment is described with reference to FIGS. 5 and 6.

Figure 5:
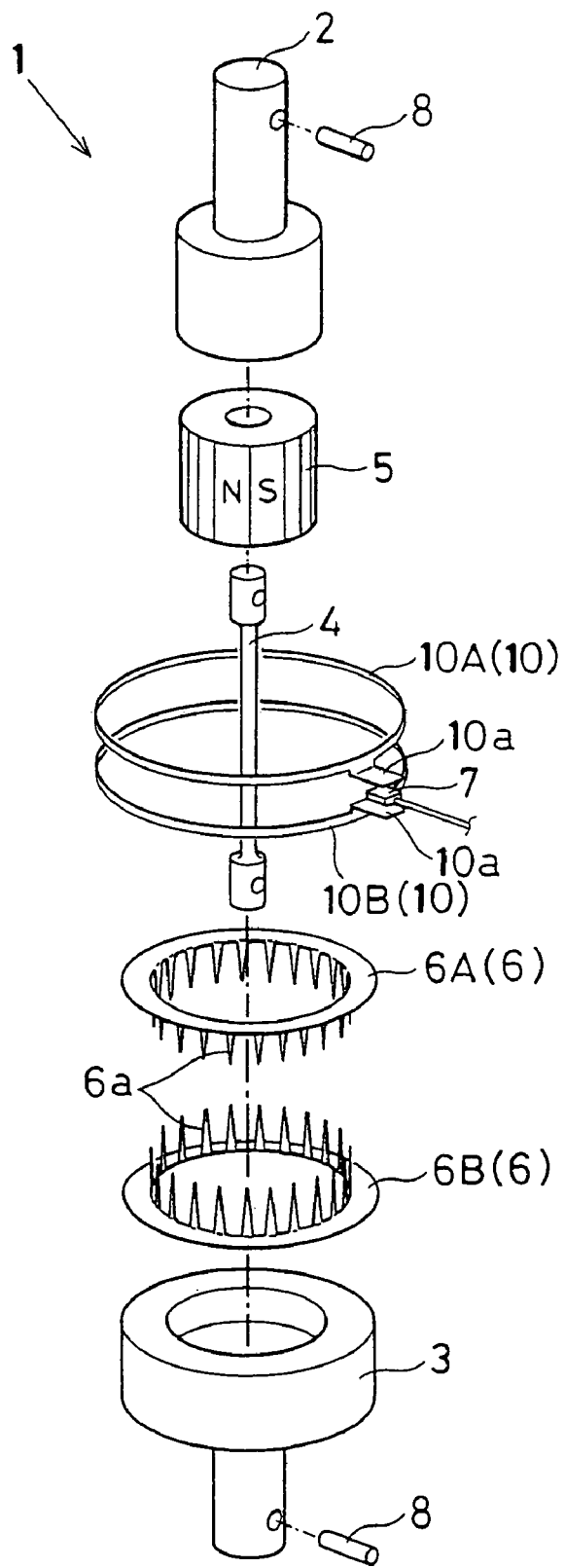
FIG. 5 is an exploded perspective view of a torque sensor according to a second embodiment of the present invention.
Figure 6:
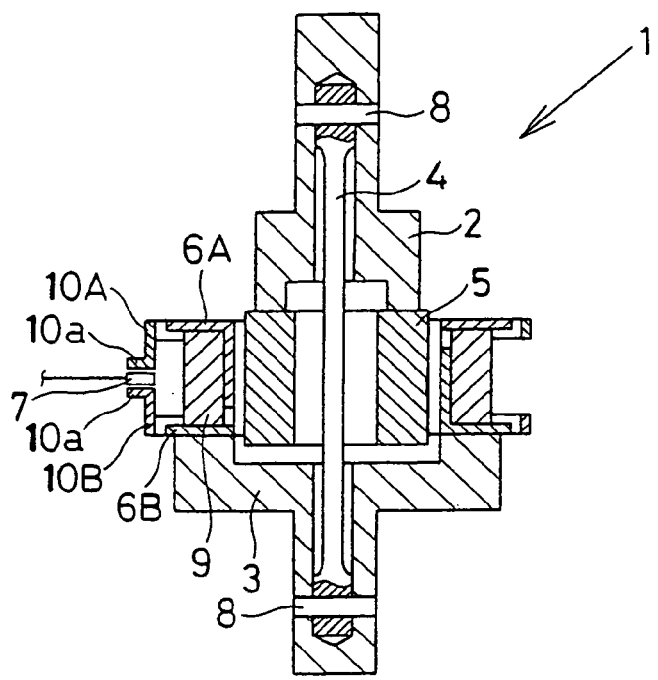
FIG. 6 is a cross sectional view of the torque sensor of FIG. 5.

FIG. 5 shows an exploded perspective view of a torque sensor 1. FIG. 6 is a cross sectional view of the torque sensor 1.

The torque sensor 1 according to the second embodiment has a pair of magnetic flux collective rings 10 (auxiliary soft magnetic member) in addition to components of the first embodiment.

Each of the magnetic flux collective rings 10 (10A, 10B) is made of same soft magnetic material as the magnetic yokes 6 and formed in a ring shape. The magnetic flux collective rings 10A and 10B are positioned around and in a vicinity of outer circumferences of the magnetic yokes 6A and 6B, respectively.

Each of the magnetic flux collective rings 10 is provided at a circumferential position thereof with a flat collective plate 10a. The collective plates 10a of the magnetic flux collective rings 10A and 10B are axially opposed to each other. Axial distance between the collective plates 10a is shorter than that between the other parts, of the magnetic flux collective rings 10A and 10B. The magnetic sensor 7 is positioned between the collective plates 10a axially opposed to each other and detects magnetic flux density generated between the collective plates 10a.

With the construction mentioned above, magnetic flux generated from the magnet 5 is collected with priority on the collective plates 10a via the magnetic yokes 10, since the magnetic flux collective rings 10 constitute a part of magnetic circuit. The magnetic sensor 7 detects magnetic flux density between the collective plates 10a, whose value is an average value of the magnetic flux density between the entire circumferences of the magnetic yokes 6. Accordingly, in the torque sensor 1 according to the second embodiment, detecting errors are hardly caused by manufacturing or errors, assembly inaccuracy of the components constituting the magnetic circuit or misalignment between the input and output shafts 2 and 3.

Third Embodiment

Figure 7:
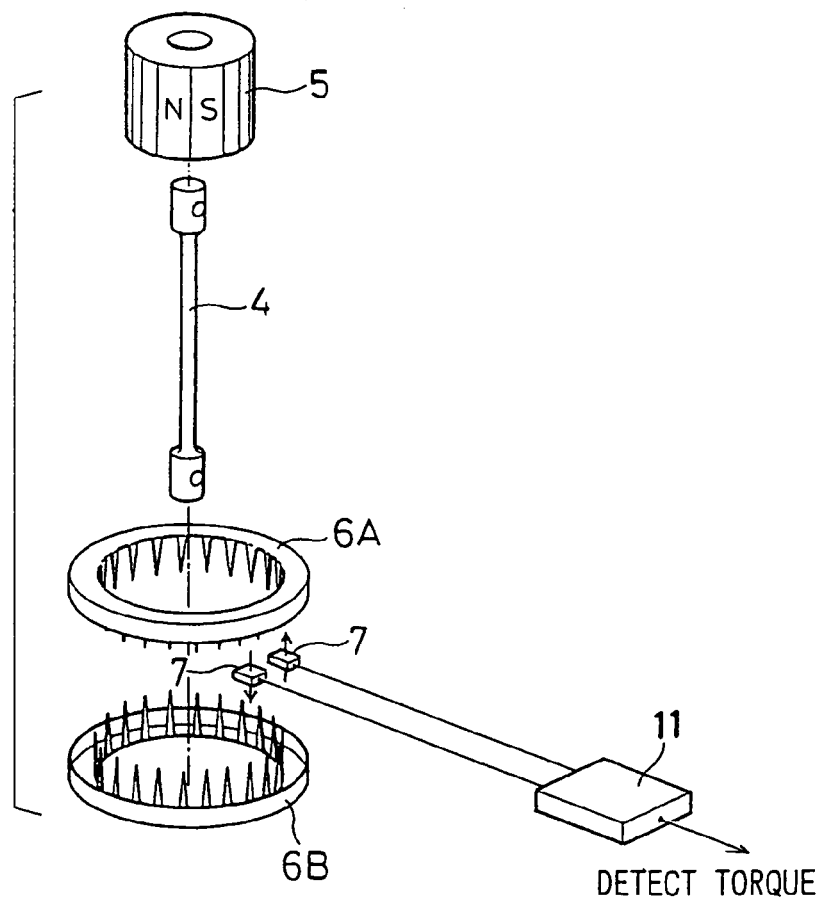
FIG. 7 is an exploded perspective view of a part of a torque sensor according to a third embodiment of the present invention.

A torque sensor 1 according to a third embodiment is described with reference to FIG. 7. FIG. 7 shows an exploded perspective view of a part of the torque sensor 1.

The torque sensor 1 according to the third embodiment has two magnetic sensors 2 which are positioned in the axial gap between the magnetic yokes 6A and 6B. Magnetism detecting directions of the respective magnetic sensors 7 are opposite to each other, as shown in arrows marks in FIG. 7. Each of the magnetic sensors 7 is connected to a differential circuit 11. The differential circuit 11 outputs a torque signal after output signals from the magnetic sensors 7, which are input to the differential circuit 11, are processed differentially therein.

In case of a single magnetic sensor 7 the detection fluctuation due to a position where the magnetic sensor is located is relatively large. However, as the torque sensor 1 according to the third embodiment has two magnetic sensors 7, the detecting fluctuation due to positions where the magnetic sensors are located is smaller.

Further, output difference between the magnetic sensors 7 can be effectively used for canceling temperature drift and increasing detection sensitivity.

The differential circuit 11 may be or not be a component of the torque sensor 1. Unless the differential circuit is the component of the torque sensor 1, ECU (not shown) plays a roll of the differential circuit 11 and may execute differential processes based the output of the magnetic sensors 7 for calculating the torque.

The two magnetic sensors according to third embodiment may be applied to the second embodiment, too.

Fourth Embodiment

Figure 8:
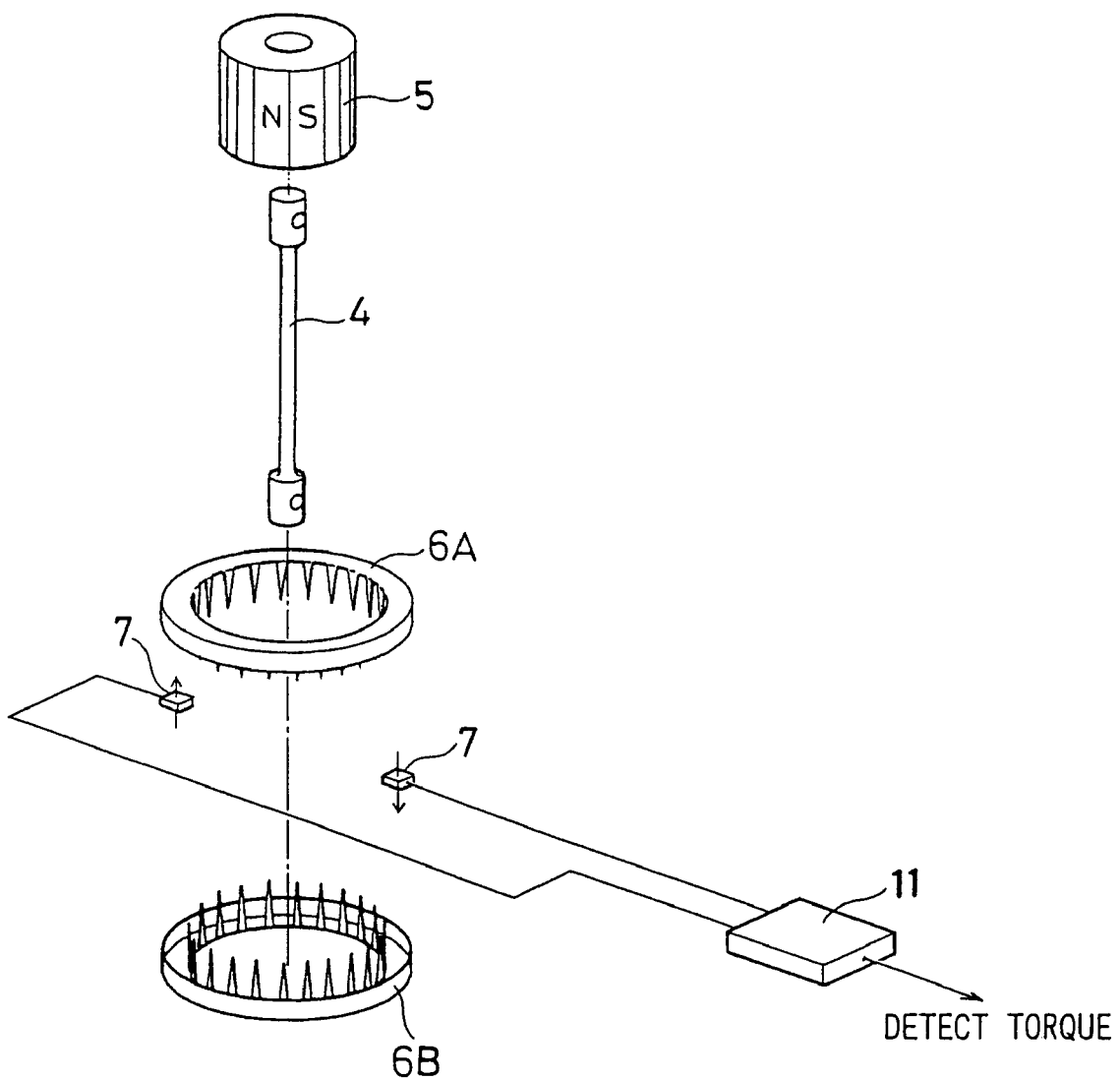
FIG. 8 is an exploded perspective view of a part of a torque sensor according to a fourth embodiment of the present invention.

A torque sensor 1 according to a fourth embodiment is described with reference to FIG. 8. FIG. 8 shows an exploded perspective view of a part of a torque sensor 1.

The torque sensor 1 according to the fourth embodiment has two magnetic sensors 7, which is similar to the third embodiment. The two magnetic sensors 7 are arranged symmetrically with respect to the torsion bar 4 (on radially opposite sides of the torsion bar 4) in the axial gap between the magnetic yokes 6A and 6B. Magnetism detecting directions of the respective magnetic sensors 7 are opposite to each other, as shown in arrows marks in FIG. 8. Each of the magnetic sensors 7 is connected to a differential circuit 11. The differential circuit 11 outputs a torque signal after output signals from the magnetic sensors 7, which are input to the differential circuit 11, are processed differentially therein.

As the torque sensor 1 according to the fourth embodiment has two magnetic sensors 7, which is similar to the third embodiment, the detection is less affected by positions where the magnetic sensors are located and, therefore, the detection accuracy is higher, compared with that of the single magnetic sensor.

Further, output difference between the magnetic sensors 7 can be effectively used for canceling temperature drift and increasing detection sensitivity twice because detection physical quantity is doubled. Moreover, the misalignment between the input and output shaft 2 and 3 is less affected on detecting accuracy.

The differential circuit 11 may be or not be a component of the torque sensor 1. Unless the differential circuit 11 is the component of the torque sensor 1, ECU (not shown) plays a roll of the differential circuit 11 and may execute differential processes based the outputs of the magnetic sensors 7 for calculating the torque.

Fifth Embodiment

Figure 9:
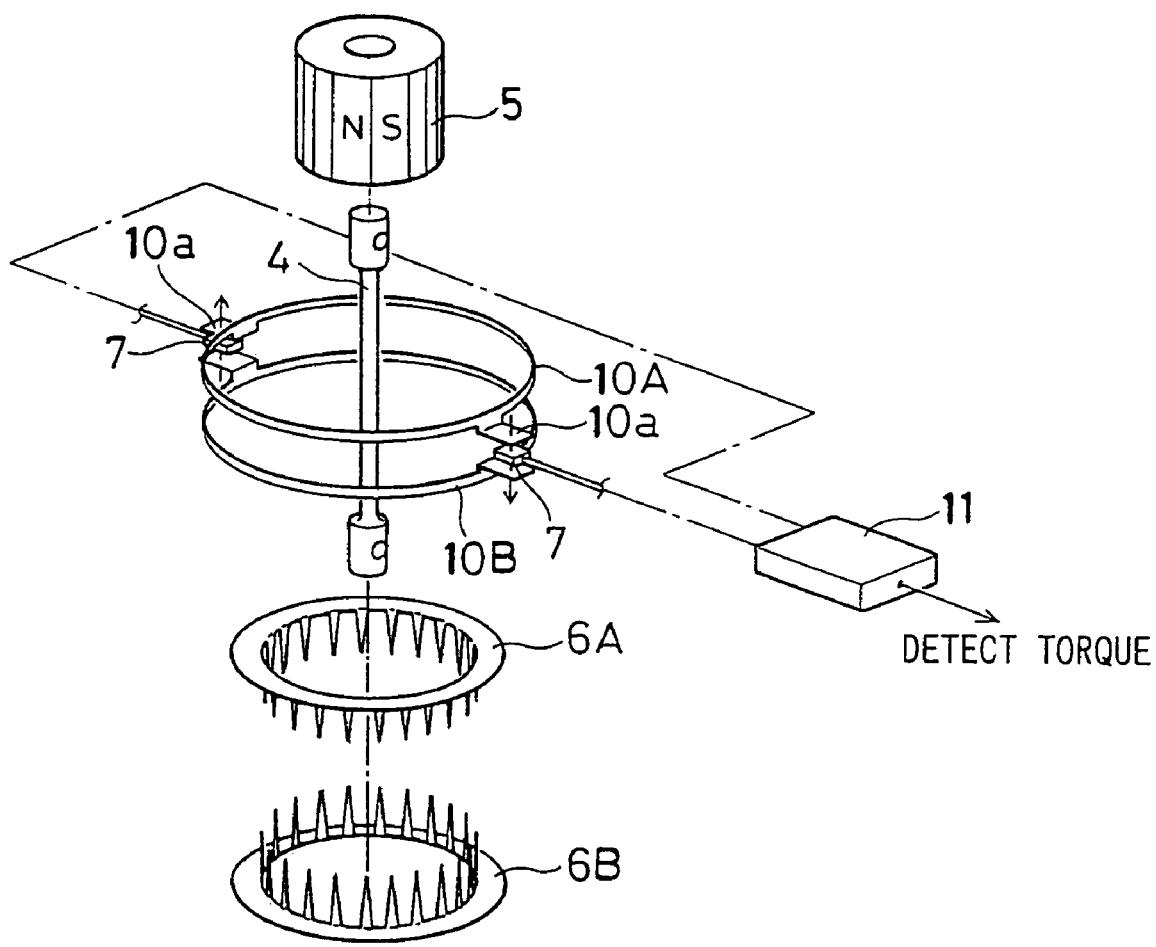
FIG. 9 is an exploded perspective view of a part torque sensor according to a fifth embodiment of the present invention.

A torque sensor 1 according to a fifth embodiment is described with reference to FIG. 9. FIG. 9 shows an exploded perspective view of a part of a torque sensor.

The torque sensor 1 according to the fifth embodiment has two magnetic sensors 7 arranged symmetrically with respect to the torsion bar 4 in the collective plates 10a of the magnetic flux collective rings 10 (10A, 10B), which is similar to the second embodiment. The collective plates 10a according to the fifth embodiment are two pairs of collective plates 10a which are circumferentially spaced at 180° intervals, as shown in FIG. 9.

Each of the two magnetic sensors 7 is positioned between one of the pairs of the collective plates 10a axially opposed to each other. Magnetism detecting directions of the respective magnetic sensors 7 are opposite to each other, as shown in arrows marks in FIG. 9. Each of the magnetic sensors 7 is connected to a differential circuit 11. The differential circuit 11 outputs a torque signal after output signals from the magnetic sensors 7 are processed differentially therein.

The fifth embodiment has not only an advantage that each of the magnetic sensors 7 detects an average value of the magnetic flux density between the entire circumferences of the magnetic yokes 6 because of using the magnetic flux collective rings 10 but also another advantage that the detection sensitivity is twice and the misalignment between the input and output shaft 2 and 3 is less affected on detecting accuracy.

Sixth Embodiment

Figure 10:
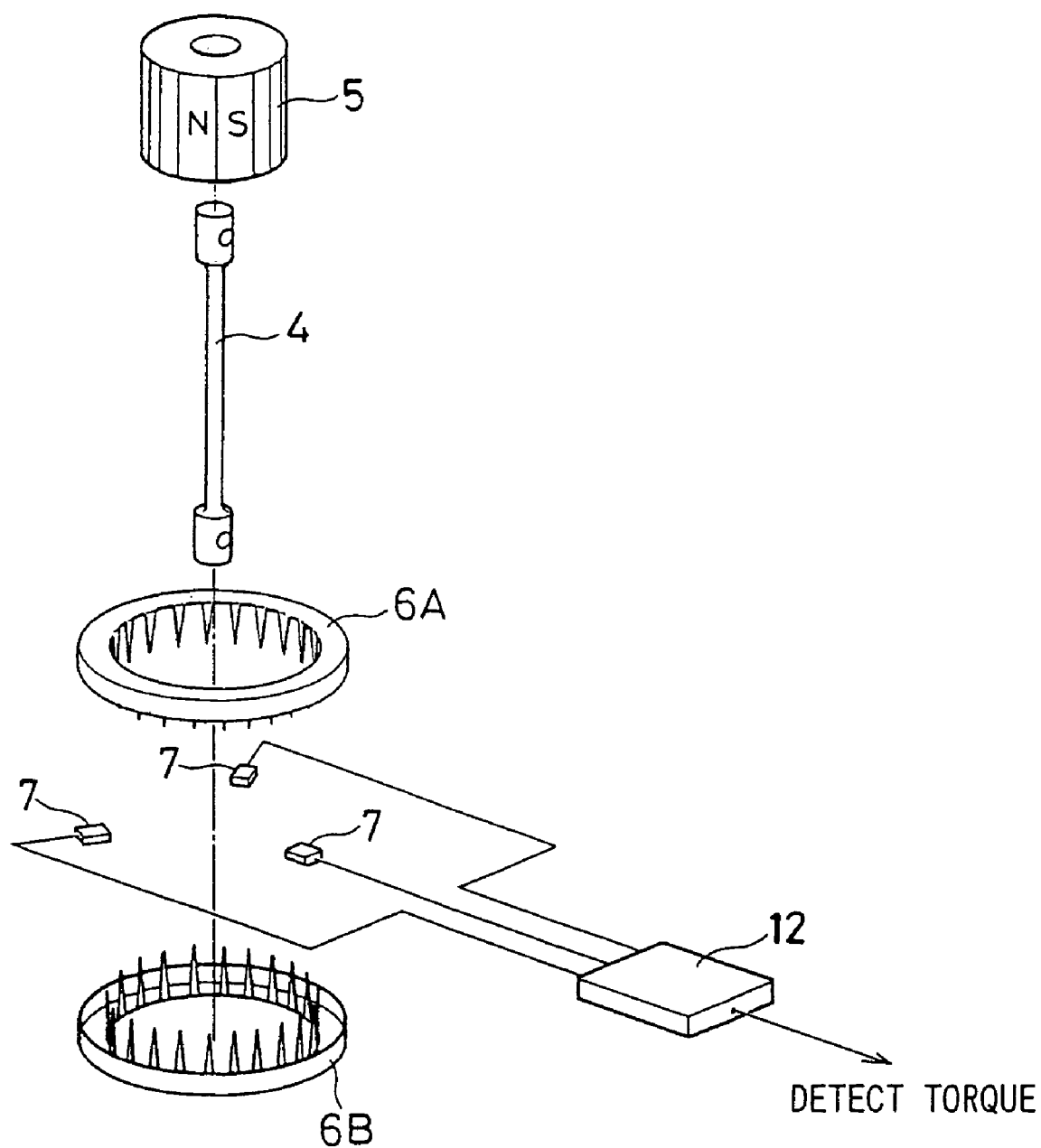
FIG. 10 is an exploded perspective view of a part of a torque sensor according to a sixth embodiment of the present invention.

A torque sensor 1 according to a sixth embodiment is described with reference to FIG. 10. FIG. 10 shows an exploded perspective view of a part of a torque sensor 1.

The torque sensor 1 according to the sixth embodiment has more than two pieces of magnetic sensors 7 (three pieces of magnetic sensors 7 in this embodiment).

The three magnetic sensors 7, which are circumferentially spaced at constant intervals, are arranged in the axial space between the magnetic yokes 6A and 6B and connected to a calculation circuit 12. Magnetism detecting directions of the respective magnetic sensors 7 are same to one another. The calculation circuit 12 outputs a torque signal after processing to add or average outputs of the three magnetic sensors 7.

Since the torque sensor 1 according to the sixth embodiment has three magnetic sensors 7 and the outputs thereof are processed through adding or average calculation, the detecting accuracy is remarkably improved, compared with that of the single magnetic sensor 7, whose detection of the magnetic flux density is largely affected by the position where the magnetic sensor 7 is located.

The calculation circuit 12 may be or not be a component of the torque sensor 1. Unless the calculation circuit 12 is the component of the torque sensor 1, ECU (not shown) plays a roll of the calculation circuit 12 and may execute adding or average processes based the outputs of the magnetic sensors 7 for calculating the torque.

Seventh Embodiment

Figure 11:
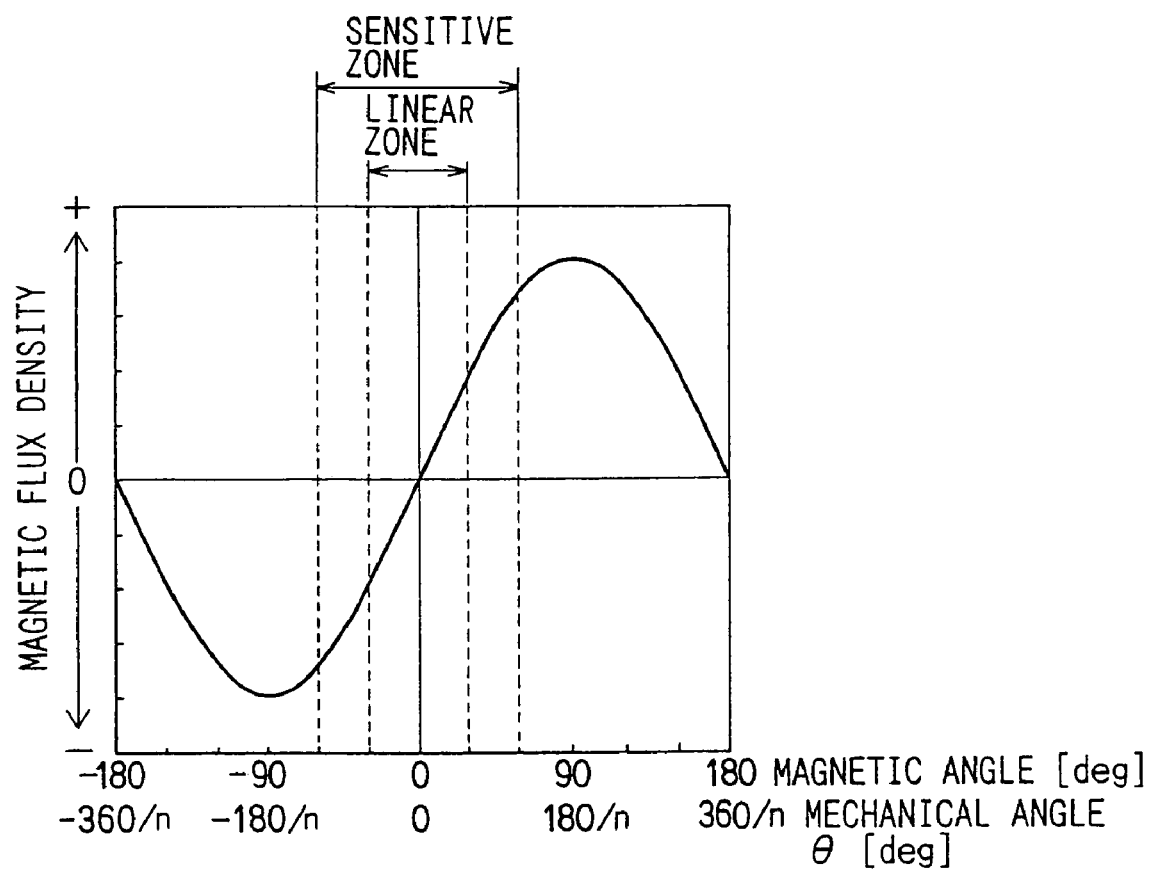
FIG. 11 is a chart showing a relationship between magnetic flux density and magnetic or mechanical angle of the torsion bar according to a seventh embodiment of the present invention.

FIG. 11 shows a graph illustrating a relationship between, a twist angle of the torsion bar 4 (a displacement angle of the magnet 5 to the magnetic yokes 6) and magnetic flux density generated between the magnetic yokes 6. The twist angle of the torsion bar 4 is shown as a maximum twist angle of the torsion bar 4 in relation with a polar number of the magnet 5 or the magnetic yokes 6.

As shown in FIG. 11, if the following formula (1) is satisfied, torque can be accurately detected (sensible zone).

$$\theta_{max} \times n \leq 120 \text{ [deg]} \tag{1}$$

where $\theta_{max}$ is a maximum twist angle of the torsion bar 4 and n is a polar number of the magnet 5 or the magnetic yokes 6.

Preferably, if the following formula (2) is satisfied, torque can be more accurately detected since the value of the magnetic flux density is more linearly changed with respect to the maximum twist angle of the torsion bar 4 (linear zone).

$$\theta_{max} \times n \leq 60 \text{ [deg]} \tag{2}$$

Eighth Embodiment

Figure 12:
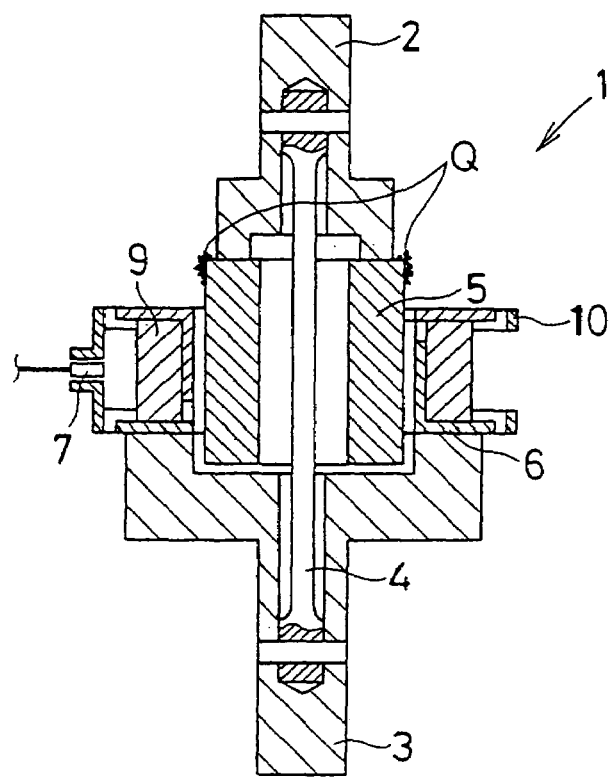
FIG. 12 is a cross sectional view of a torque sensor according to an eighth embodiment of the present invention.
Figure 13:
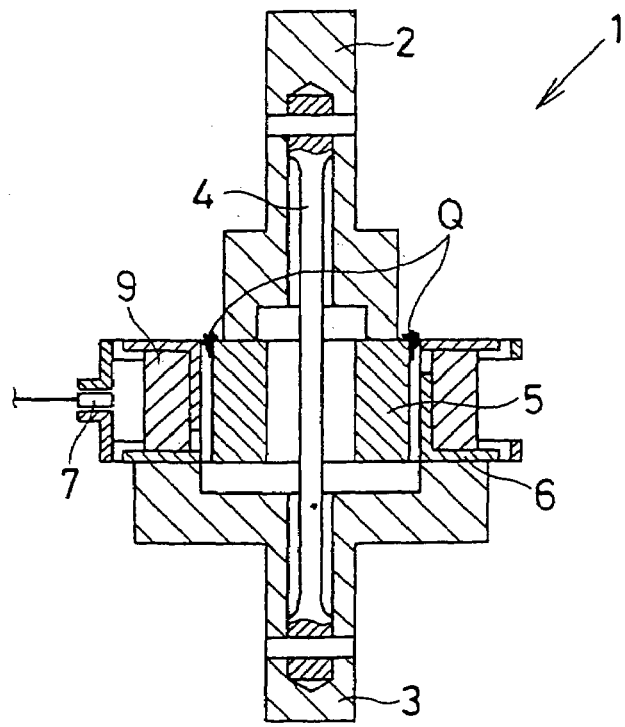
FIG. 13 is a cross sectional view of a torque sensor for a purpose of comparing with the torque sensor according to the eighth embodiment.

A torque sensor 1 according to an eighth embodiment is described with reference to FIG. 12. FIG. 12 shows an exploded perspective view of a torque sensor 1.

The torque sensor 1 according to the eighth embodiment has a magnet 5 whose axial length is longer than that of the magnetic yokes 6, as shown in FIG. 12.

For example, in the torque sensor 1 in which an axial length of the magnet 5 is substantially equal to or shorter than that of the magnetic yokes 7, a radial gap between the magnet 5 and the magnetic yokes 7 is prone to be filled with iron filings Q, if invaded into the torque sensor 1 from outside, which cause short circuit of the magnetic circuit and, thus, erroneous detection.

However, in a case that opposite axial ends of the magnet 5 axially protrude out of the opposite axial ends of the magnetic yokes 7, as shown in the eighth embodiment, the iron filings Q are stuck to edges of the magnet 5 (since the magnet 5 has characteristics that magnetic flux is concentrated to the edges thereof), which does not adversely affect on the magnetic circuit for detecting the torque so that the erroneous detection may be avoided.

Ninth Embodiment

Figure 14:
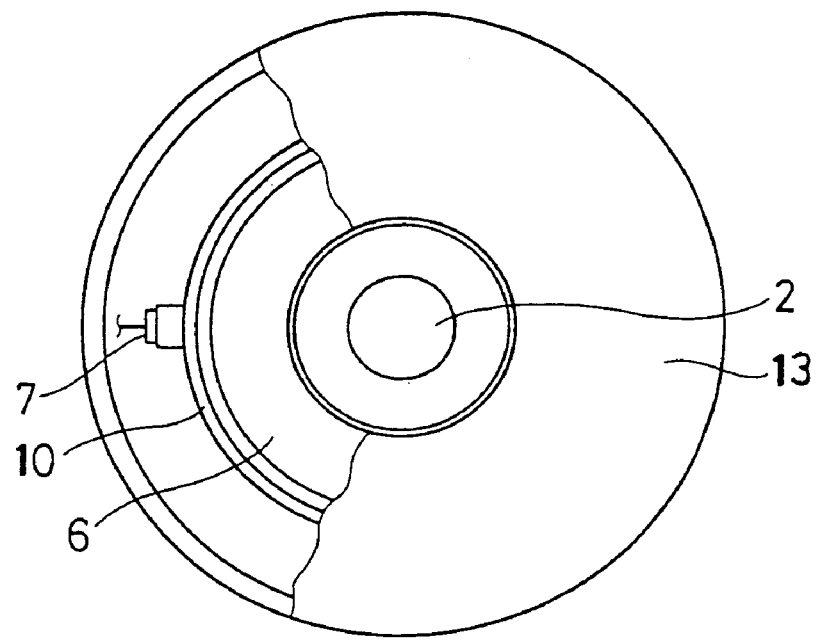
FIG. 14 is a plan view of a torque sensor according to a ninth embodiment of the present invention.
Figure 15:
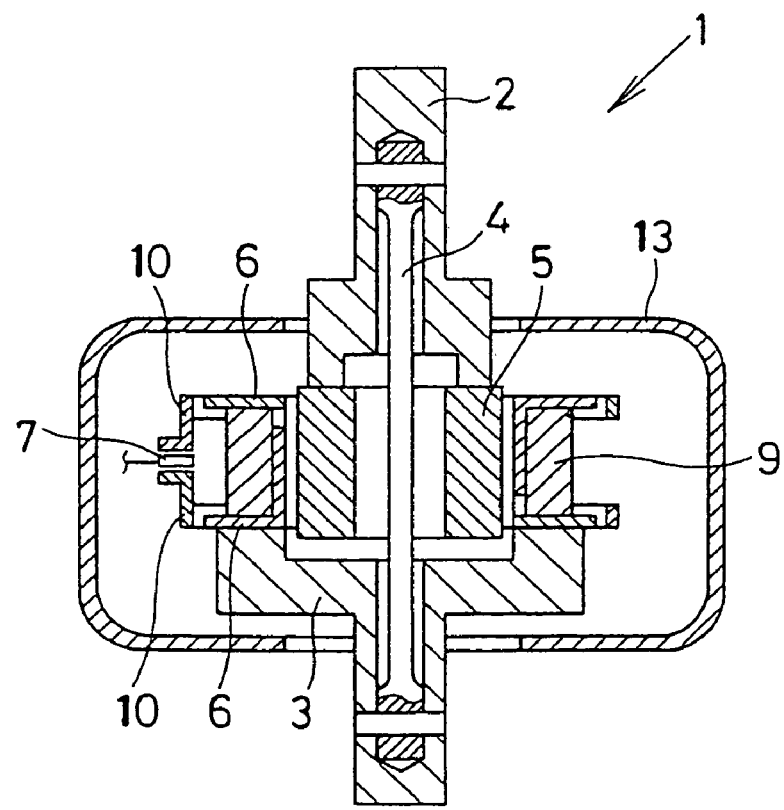
FIG. 15 is a cross sectional view of the torque sensor of FIG. 14.

FIG. 14 shows a plan view of a torque sensor 1 according to a ninth embodiment. FIG. 15 shows a cross sectional view of the torque sensor 1 according to the ninth embodiment.

The torque sensor 1 according to the ninth embodiment has a magnetic seal 13 (magnetic material) covering a substantially entire portion of the magnetic circuit thereof.

The magnetic seal 13 is formed in cylindrical shape, as shown in FIGS. 14 and 15. The magnetic seal 13 serves to shut out influences of terrestrial magnetism and magnetic fields generated around the torque sensor 1 so that the erroneous detection is avoided.

Figure 16:
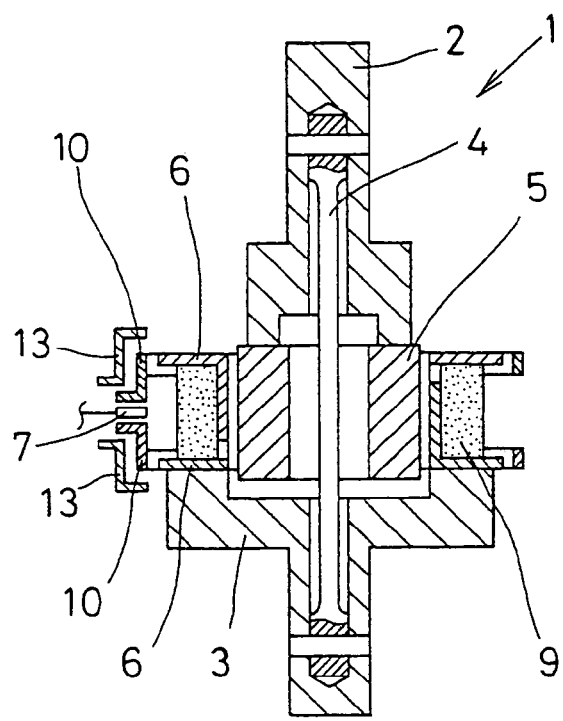
FIG. 16 is a cross sectional view of a torque sensor according to a modification of the ninth embodiment.

Further, as shown in FIG. 16, the magnetic seal 13 may cover only the magnetic sensor 7 without covering the entire portion of the magnetic circuit of the torque sensor 1.

Tenth Embodiment

Figure 17:
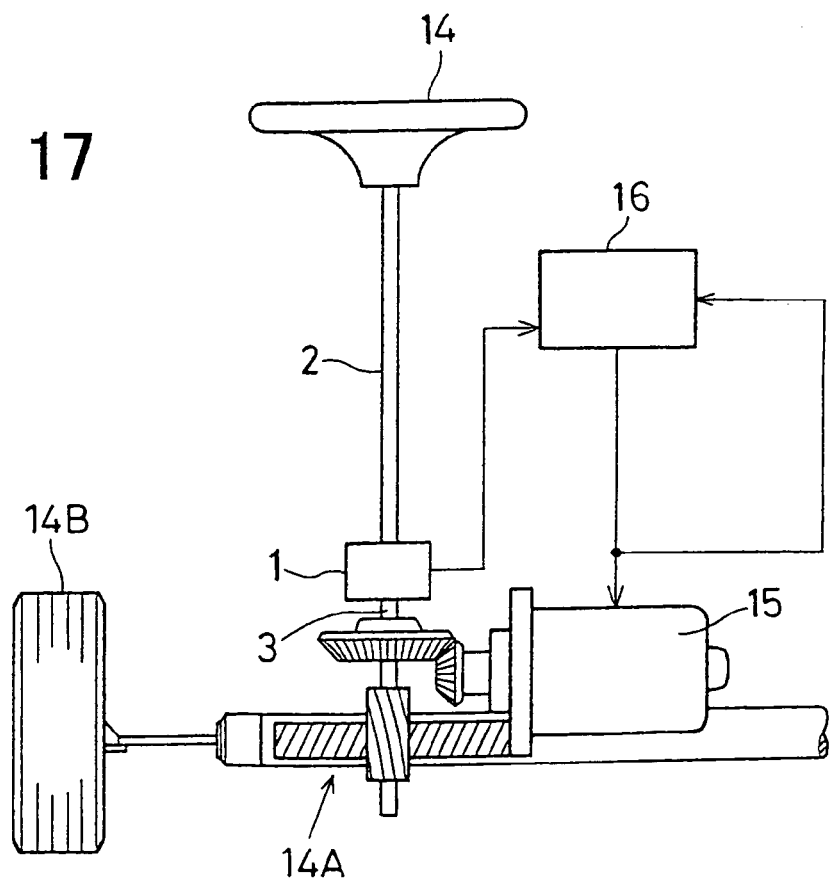
FIG. 17 is a schematic view of an entire electric power steering system according to a tenth embodiment of the present invention.

An electric power steering system incorporating the torque sensor of the present invention according to a tenth embodiment is described with FIG. 17.

The electric power steering system according to the tenth embodiment is composed of an electric motor 14 for giving additional force to a steering power transmission mechanism 14A, which connect the output shaft 3 and wheels 14B, for assisting the steering torque applied to a steering 14 by a driver, the torque sensor 1 for detecting the steering torque applied to the steering 14 and a control circuit for controlling current to be supplied to the electric motor 15 in response to the value of the torque detected by the torque sensor 1. The construction of the torque sensor 1 is, for example, same as that of the first embodiment.

As the electric power steering system mentioned above does not have a coil for detecting change of magnetic fields and a coil for compensating temperature change, which are provided in a conventional electric power steering system, a large housing for accommodating these coils is not necessary.

Further, torque sensor 1 does not emit electric noises with less power consumption, since alternating current is not applied to the coil as in the conventional torque sensor.

The magnetic sensor 7 uses the hole IC which causes the torque sensor 1 compact and inexpensive since auxiliary circuits such as a gain adjusting circuit, an offset adjusting circuit and a temperature compensation circuit are not necessary, so the torque sensor 1 can be composed of less number of components.

Further, since the hole IC does not require an oscillating circuit so that noises are hardly radiated, the hole IC does not give a noise problem to surrounding electric devices.

Furthermore, since electric components other than the hole IC are not necessary, the magnet sensor 7 can be operative with less power consumption and at relatively high temperature, which the hole IC can endure for its use.

Moreover, since the gain adjustment, the offset adjustment and the temperature compensation, which have been executed by ECU in the conventional torque sensor, can be performed within the hole IC, quality assurance of the torque sensor 1 is available as a single body and, if the torque sensor 1 fails only the failed torque sensor 1 can be replaced without consulting with the other components such as ECU. Further, it is not necessary to initialize the torque sensor 1, when the torque sensor 1 is assembled to a torque sensor system, for example, to the electric power steering system, resulting higher productivity and lower cost.

Eleventh Embodiment

Figure 18:
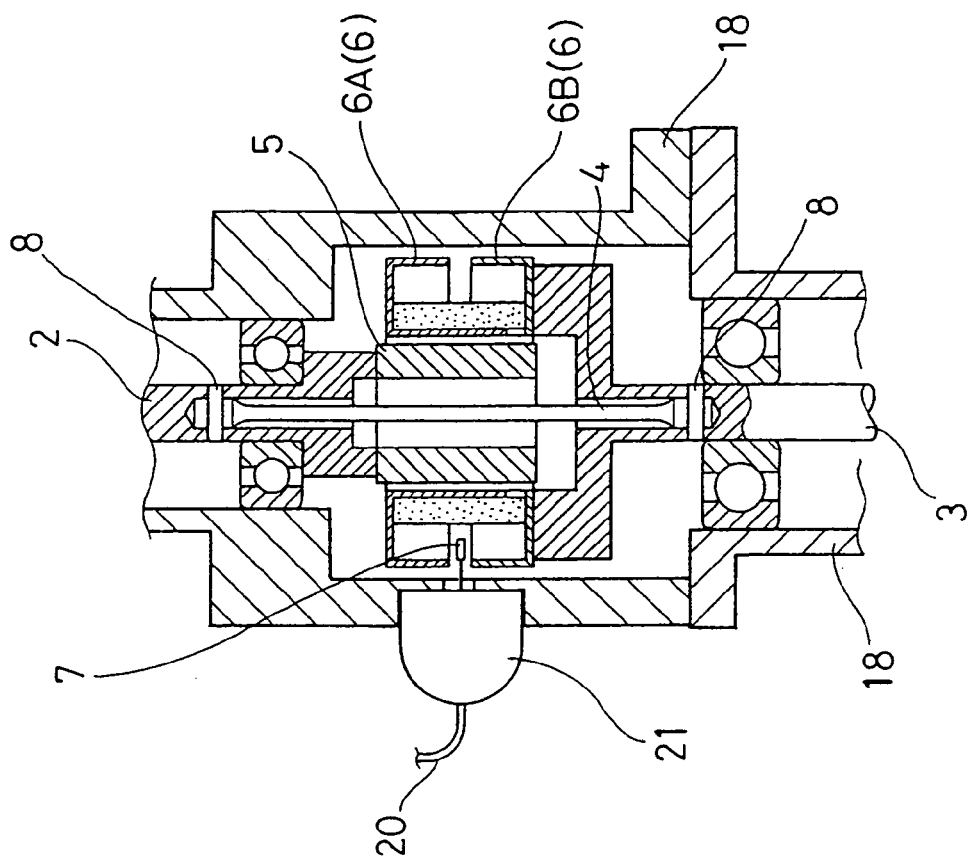
FIG. 18 is a cross sectional view of a torque sensor according to an eleventh embodiment of the present invention.

As shown in FIG. 18, an electric power steering system according to an eleventh embodiment has a circuit board 17 in which the control circuit 16 (refer to FIG. 17) and the magnetic sensor 7 for the torque sensor 1 are simultaneously installed. The circuit board 17 is fixed, for example, with screws to a housing 18 in which the torque sensor 1 is accommodated.

In this case, wire harnesses and connectors for connecting the torque sensor 1 and the control circuit 16 are not necessary, which results in cost saving and better reliability because of no electric contacts.

Twelfth Embodiment

Figure 19:
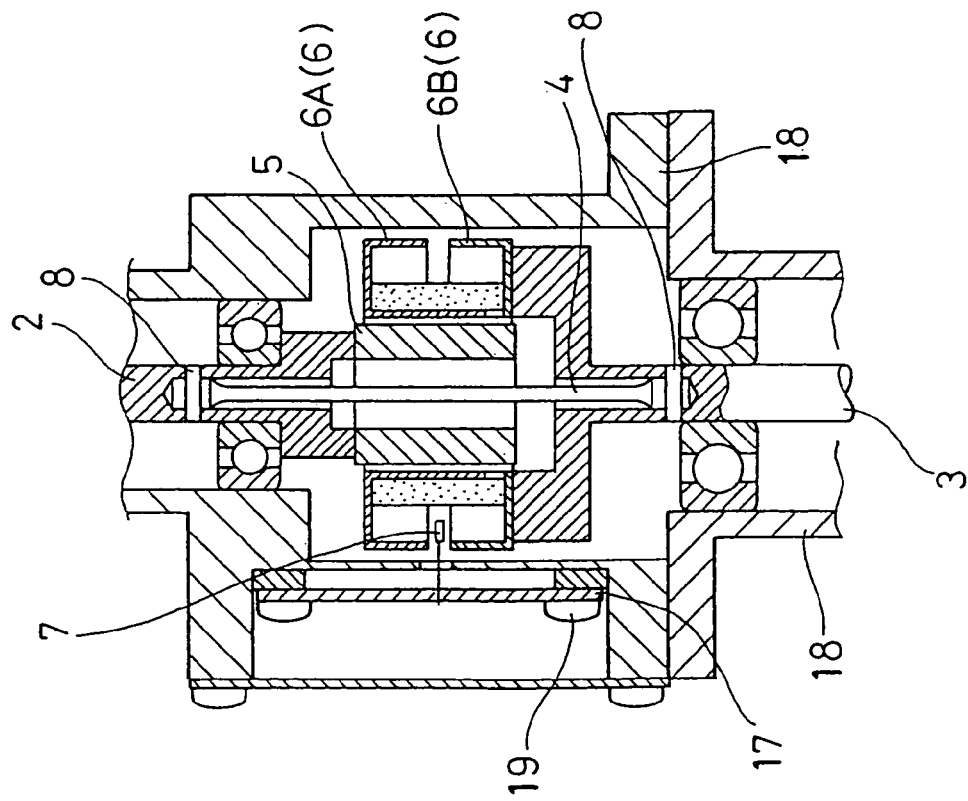
FIG. 19 is a cross sectional view of a torque sensor according to a twelfth embodiment of the present invention.

As shown in FIG. 19, in an electric power steering system, according to a twelfth embodiment, the magnetic sensor 7 is mounted on a connector or plug 21 of a wire harnesses 20 for connecting the torque sensor 1 and the control circuit 16.

In this case, if the connector 21 with the magnet sensor 7 is simply inserted into a housing 18 of the torque sensor 1, the assembly of the magnet sensor 7 is simpler Thirteenth Embodiment In an electric power steering system according to a thirteenth embodiment, a sensing portion S of the torque sensor 1 can be assembled at a later time. The sensing portion S is composed of a ring shaped magnet 5, a pair of ring shaped magnetic yokes 6(6A, 6B) and a magnetic sensor 7.

Figure 20A:
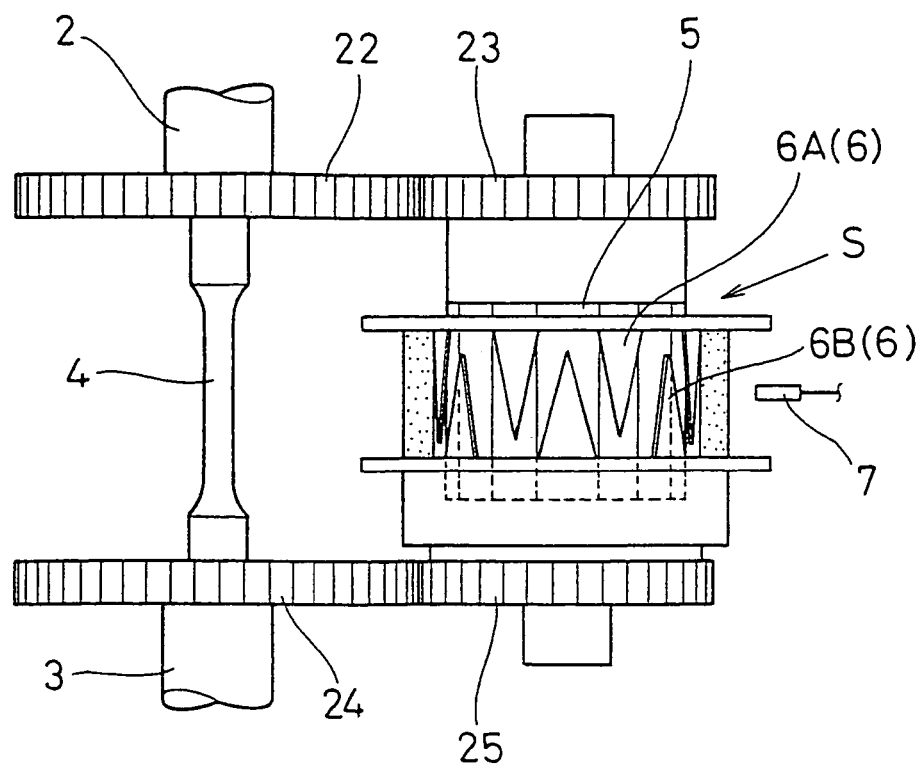
FIG. 20A is a perspective view of a torque sensor according to a thirteenth embodiment of the present invention.
Figure 20B:
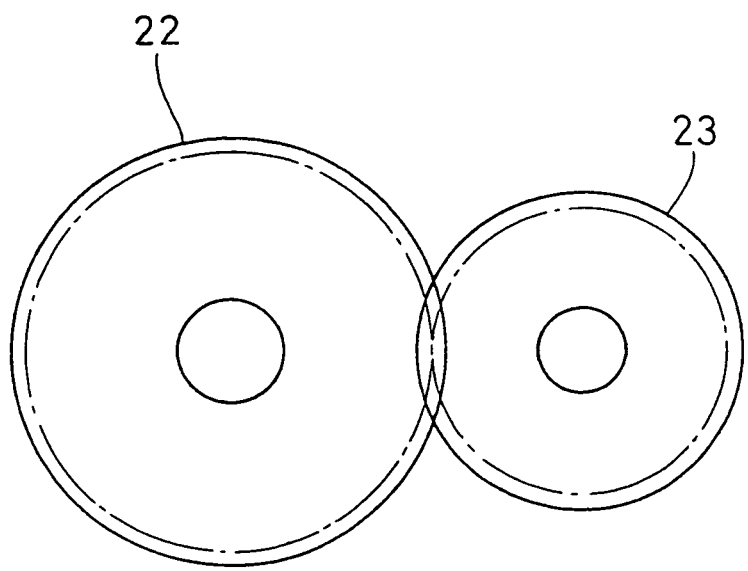
FIG. 20B is a plan view of a rotation transmission member of the torque sensor of FIG. 20A.

As shown in FIG. 20, an input shaft 3, a torsion bar 4 and an output shaft 3 are axially in alignment with one another. The sensing portion S is positioned axially in parallel with, the torsion bar 4. The input shaft 2 is connected to the magnet 5 via a first torque transmission member that is composed of a gear 22 attached coaxially to the input shaft 2 and a gear 23 attached coaxially to the magnet 5a. The gears 22 and 23 are in mesh so that rotation of the input shaft 2 is transmitted to the magnet 5. The output shaft 3 is connected to the magnetic yokes 6 via a second torque transmission member that is composed of a gear 24 attached coaxially to the output shaft 3 and a gear 25 attached coaxially to the magnetic yokes 6. The gears 24 and 25 are in mesh so that rotation of the output shaft 3 is transmitted to the magnetic yokes 6.

With the construction mentioned above, the sensing portion S can be assembled separately after the input shaft 2 with the gear 22, the torsion bar 4, the output shaft 3 with the gear 25, the electric motor 15 (refer to FIG. 17) and the steering power transmission mechanism 14A (refer to FIG. 17) are assembled in advance. Accordingly, it is simpler to assemble the sensing portion S to the electric power steering system. Further, the sensing portion S can be replaced as a single body, which facilitates maintenance operation.

Fourteenth Embodiment

Figure 21B:
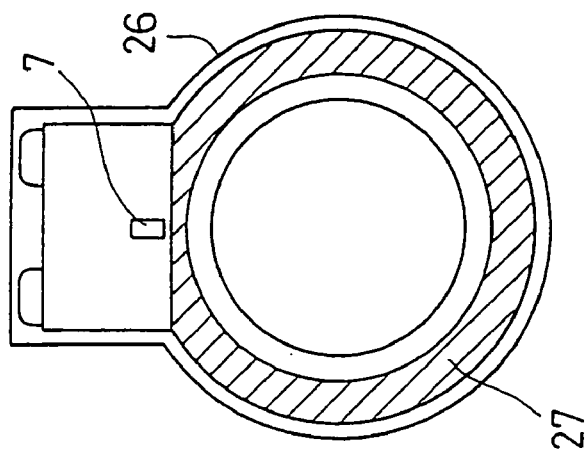
FIG. 21B is a schematic view of the torque sensor of 21A as viewed axially.
Figure 21A:
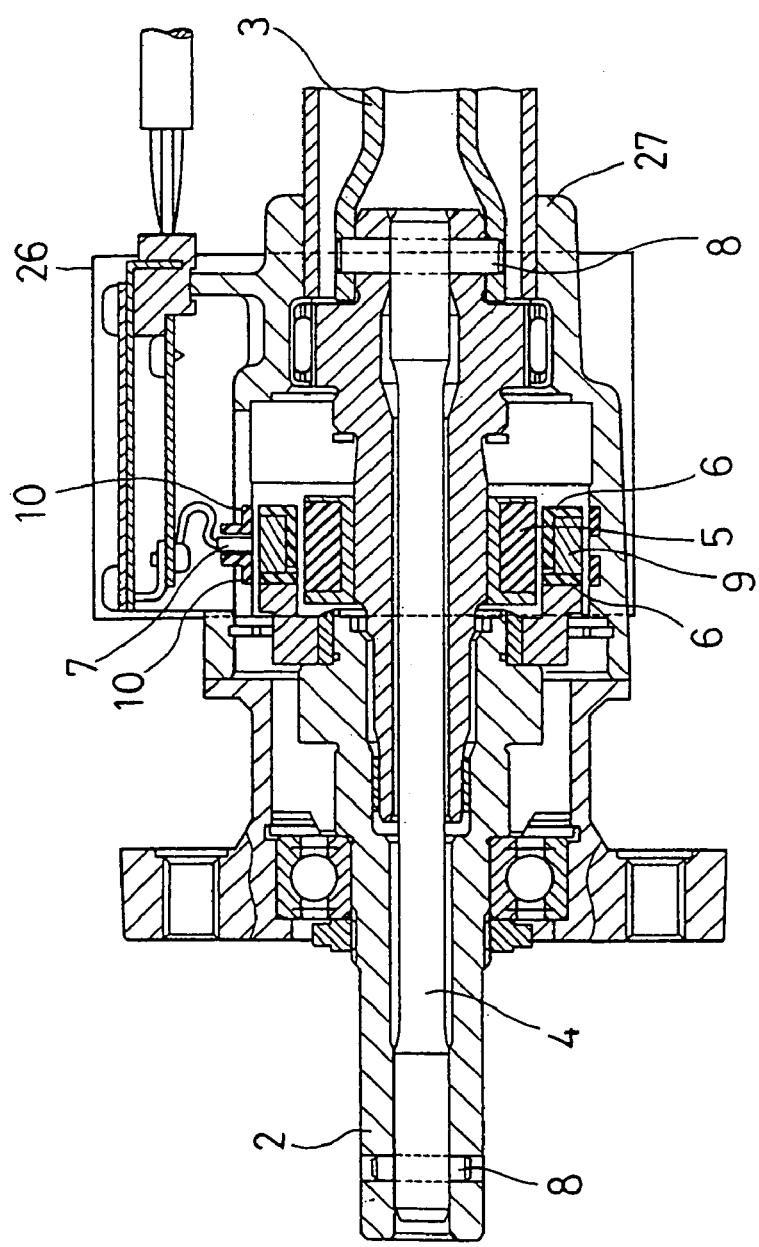
FIG. 21A is a cross sectional view of a torque sensor mounted on a column housing according to a fourteenth embodiment of the present invention.

As shown in FIG. 21, an electric power steering system according to a fourteenth embodiment has a magnetic seal 26 surrounding the torque sensor 1. The magnetic seal 26 covers entire outer circumference of a column housing 27 (for example, made of aluminum) in which the torque sensor 1 is housed.

The torque sensor 1 to be used in the electric power steering system is prone to erroneously detect the torque, if influenced by outside magnetic fields generated by, for example, onboard speakers (incorporating magnet members). Accordingly, magnetic sealing around the outer circumference of the torque sensor 1 prevents the torque sensor 1 from erroneously detecting due to the outside magnetic fields.

Figure 22B:
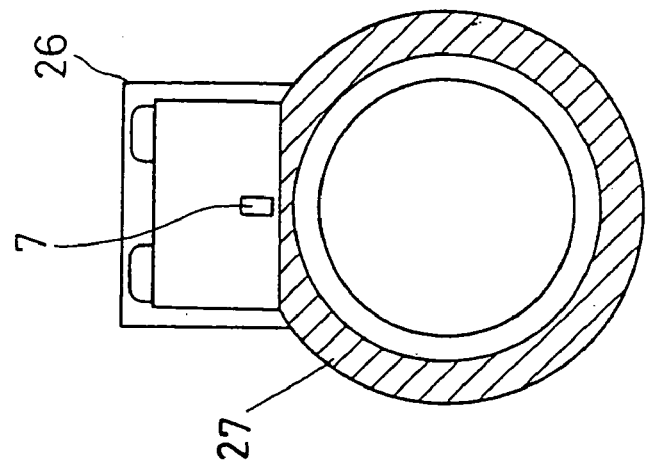
FIG. 22B is a schematic view of the torque sensor of FIG. 22A as viewed axially.
Figure 22A:
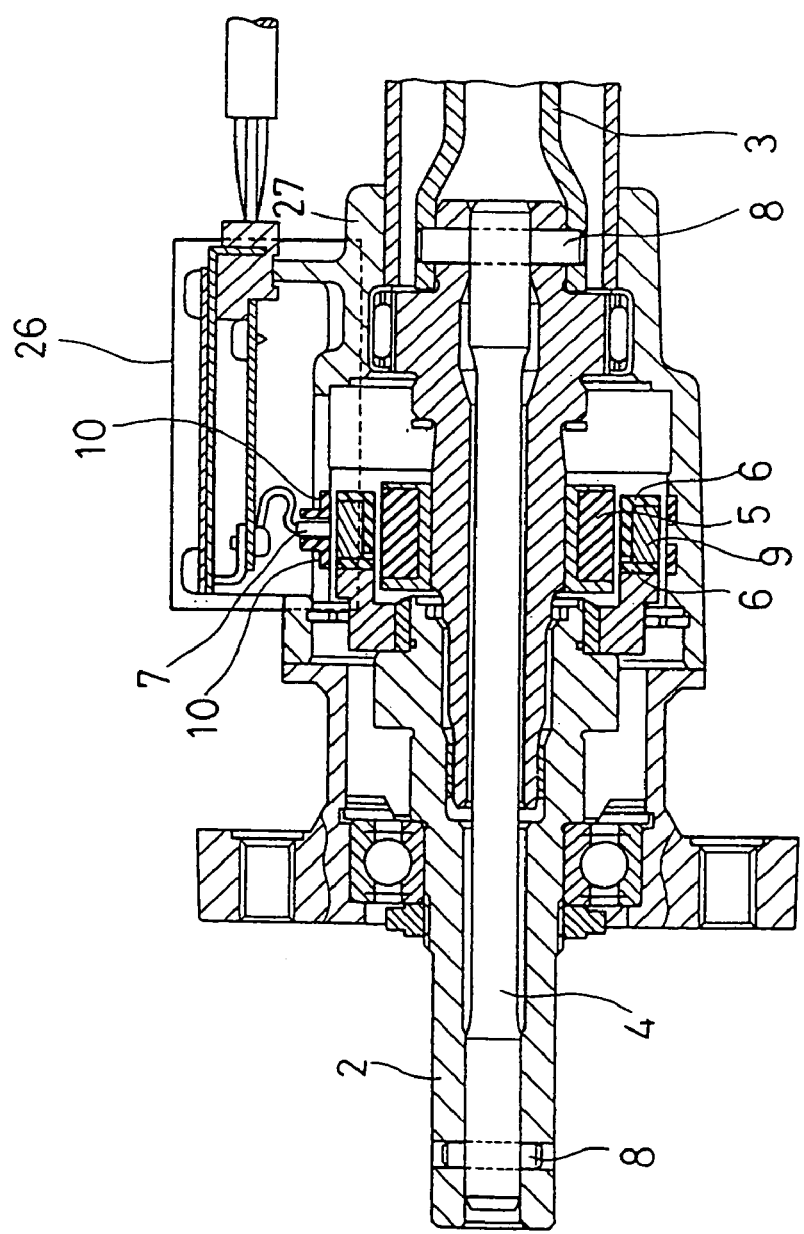
FIG. 22A is a cross sectional view of a torque sensor mounted on a column housing according to a modification of the fourteenth embodiment.

As shown in FIG. 22, in place of magnetic sealing the entire outer circumference of the column housing 27, only a portion of the column housing 27 where the magnetic sensor 7 is positioned may be magnetic sealed.

In the embodiments mentioned above, instead that the magnet 5 is connected to the first shaft 2 or the torsion bar 4 on a side of the first shaft 2 and the magnetic yoke 6 is connected to the second shaft 3 or the torsion bar 4 on a side of the second shaft 3, the magnet 5 may be connected to the second shaft 3 or the torsion bar 4 on a side of the second shaft 3 and the magnetic yokes 6 may be connected to the first shaft 2 or the torsion bar 4 on a side of the first shaft 2.

Further, to assemble the magnet 5 and the magnetic yokes 6 in the torque sensor 1, after the magnet 5 is fixed at first to the torsion bar 4 or one of the input and output shafts 2 and 3, the magnetic yokes 6 may cover the magnet 5 to define a magnetic yoke rest position and, then, the magnetic yokes 6 may be fixed to the torsion bar 4 or the other of the input and output shafts 2 and 3 to maintain the magnetic yoke position.

What is claimed is:

1. A torque sensor for detecting torsion torque to be applied to a first shaft and a second shaft comprising:

a resilient member disposed between and fixed to the first and second shafts so that the first shaft, the resilient member and the second shaft are coaxially in alignment with one another, the resilient member being resiliently twisted, when torsion torque is applied to the first shaft and the second shaft;

a ferromagnetic member connected to one of a given position of the first shaft and a given position of the resilient member on a side of the first shaft and rotatable together therewith, the ferromagnetic member producing a magnetic field;

a soft magnetic member connected to one of a given position of the second shaft and another given position of the resilient member on a side of the second shaft and rotatable together therewith, the soft magnetic member being positioned within the magnetic field and forming a magnetic circuit so that magnetic flux density generated in the magnetic is varied when rotation displacement of the soft magnetic member relative to the ferromagnetic member is changed according to the twist of the resilient member; and a magnetic sensor positioned in a vicinity of and without contacting the soft magnetic member for detecting the magnetic flux density generated in the magnetic circuit, wherein the ferromagnetic member is a ring shaped magnet having N and S poles alternately arranged circumferentially, the soft magnetic member comprises first and second ring shaped magnetic yokes that are positioned around an outer circumference of the ferromagnetic member and axially opposed to each other with an axial gap therebetween, each of the magnetic yokes has multiple saw-tooth shaped claws which are circumferentially spaced at constant intervals and whose number is equal to that of the N and S poles, the claws of the first magnetic yokes axially extend toward and being positioned to alternate circumferentially with those of the second magnetic yoke, each axial center of the claws of both the magnetic yokes is positioned to substantially coincide with a boundary between immediately adjacent N and S poles of the magnet, when a twist angle of the resilient member shows a reference value, and the magnetic sensor is positioned in the axial gap between the pair of the magnetic yokes.

2. A torque sensor according to claim 1, further comprising:
an auxiliary soft magnetic member having a magnetic flux collective portion, the auxiliary soft magnetic member being positioned in a vicinity of the soft magnetic member for introducing magnetic flux from the soft magnetic member and concentrating the same to the magnetic flux collective portion, wherein the magnetic sensor detects the magnetic flux density generated in the magnetic circuit through the magnetic flux collective portion.

3. A torque sensor according to claim 2, wherein a length of the axial gap between both the magnetic flux collective portions is shorter than that between both portions of the pair of auxiliary magnetic yokes other than the magnetic flux collective portions.

4. A torque sensor according to claim 1, further comprising:
a first rotation transmitting member through which the magnet is connected to the one of the given position of the first shaft and the given position of the resilient member on a side of the first shaft; and
a second rotation transmitting member through which the soft magnetic member is connected to the other of the given position of the second shaft and the given position of the resilient member on a side of the second shaft,
wherein the magnet and the pair of magnetic yokes are positioned axially in parallel with the resilient member.

5. A torque sensor according to claim 4,
wherein the first rotation transmitting member is a first gear fixed to the first shaft and a second gear fixed to the magnet, the first and second gears being in mesh with each other, and the second rotation transmitting member is a third gear fixed to the second shaft and a fourth gear fixed to the magnetic yokes, the third and fourth gears are being in mesh with each other.

6. A torque sensor according to claim 1,
wherein the magnet sensor is two sensors which are positioned apart and whose magnetism detecting directions are opposite to each other.

7. A torque sensor according to claim 6,
wherein the two sensors are positioned symmetrically with respect to an axis of the soft magnetic member.

8. A torque sensor according to claim 1,
wherein the magnetic sensor is more than two sensors which are positioned circumferentially at constant intervals and whose magnetism detecting directions are same to one another.

9. A torque sensor according to claim 2,
wherein each of the auxiliary magnetic yokes has a pair of the collective portions circumferentially spaced at 180° intervals and the pair of the collective portions of one of the auxiliary magnetic yoke are axially in alignment with the pair of the collective portions of the other thereof, respectively, and the magnetic sensor has two sensors each of which is positioned between the collective portions of the auxiliary magnetic yokes axially aligned with each other and whose magnetism detecting directions are opposite to each other.

10. A torque sensor according to claim 2,
wherein each of the auxiliary magnetic yokes has a plurality of the collective portions circumferentially spaced at constant intervals and the plurality of the collective portions of one of the auxiliary magnetic yoke are axially in alignment with the plurality of the collective portions of the other thereof, respectively, and the magnet sensor has a plurality of sensors each of which is positioned between the collective portions of the auxiliary magnetic yokes axially aligned with each other and whose magnetism detecting directions are same to one another.

11. A torque sensor for detecting torsion torque to be applied to a first shaft and a second shaft comprising:
a resilient member disposed between and fixed to the first and second shafts so that the first shaft, the resilient member and the second shaft are coaxially in alignment with one another, the resilient member being resiliently twisted, when torsion torque is applied to the first shaft and the second shaft;
a ferromagnetic member connected to one of a given position of the first shaft and a given position of the resilient member on a side of the first shaft and rotatable together therewith, the ferromagnetic member producing a magnetic field;
a soft magnetic member connected to one of a given position of the second shaft and another given position of the resilient member on a side of the second shaft and rotatable together therewith, the soft magnetic member being positioned within the magnetic field and forming a magnetic circuit so that magnetic flux density generated in the magnetic is varied when rotation displacement of the soft magnetic member relative to the ferromagnetic member is changed according to the twist of the resilient member; and
a magnetic sensor positioned in a vicinity of and without contacting the soft magnetic member for detecting the magnetic flux density generated in the magnetic circuit,
wherein
the ferromagnetic member is a ring shaped magnet having N and S poles alternately arranged circumferentially,
the soft magnetic member comprises first and second ring shaped magnetic yokes that are positioned around an outer circumference of the ferromagnetic member and axially opposed to each other with an axial gap therebetween,
each of the magnetic yokes has multiple claws which are circumferentially spaced at constant intervals and whose number is equal to that of the N and S poles,
the claws of the first magnetic yokes axially extend toward and being positioned to alternate circumferentially with those of the second magnetic yoke,
each of the claws has such a configuration that a circumferential width thereof is continuously decreased in a direction from its root, from which the claw axially extends toward the other magnetic yoke, to a forward end of the claw,
each axial center of the claws of both the magnetic yokes is positioned to substantially coincide with a boundary between immediately adjacent N and S poles of the magnet, when a twist angle of the resilient member shows a reference value, and
the magnetic sensor is positioned in the axial gap between the pair of the magnetic yokes.

* * * * *